United States Patent
Lindsey et al.

(10) Patent No.: US 12,517,378 B2
(45) Date of Patent: *Jan. 6, 2026

(54) ROTATIONAL ALIGNMENT OF INTERCHANGEABLE LOUPES

(71) Applicant: Metrex Research, LLC, Brea, CA (US)

(72) Inventors: Thomas R. Lindsey, Lodi, WI (US); Matthew Christopher Oren, Madison, WI (US); Ramesh Janardhanam, Pardeeville, WI (US)

(73) Assignee: Metrex Research, LLC, Brea, CA (US)

( * ) Notice: Subject to any disclaimer, the term of this patent is extended or adjusted under 35 U.S.C. 154(b) by 643 days.

This patent is subject to a terminal disclaimer.

(21) Appl. No.: 17/108,234

(22) Filed: Dec. 1, 2020

(65) Prior Publication Data

US 2021/0080751 A1    Mar. 18, 2021

Related U.S. Application Data

(63) Continuation of application No. 15/935,534, filed on Mar. 26, 2018, now Pat. No. 10,877,296.

(Continued)

(51) Int. Cl.
*G02B 23/00* (2006.01)
*G02B 7/02* (2021.01)
(Continued)

(52) U.S. Cl.
CPC .......... *G02C 7/086* (2013.01); *G02B 25/004* (2013.01); *G02C 3/04* (2013.01); *G02C 7/088* (2013.01)

(58) Field of Classification Search
CPC ........ G02B 23/00; G02B 23/14; G02B 23/16; G02B 23/18; G02B 25/00; G02B 25/002;
(Continued)

(56) References Cited

U.S. PATENT DOCUMENTS

| 2,507,559 | A | | 5/1950 | D'Andrea |
| 4,600,277 | A | * | 7/1986 | Murray, Jr. .......... G02B 23/125 |
| | | | | D16/132 |

(Continued)

FOREIGN PATENT DOCUMENTS

| DE | 29712274 | 10/1997 |
| EP | 1950598 | 7/2008 |

(Continued)

OTHER PUBLICATIONS

Extended European Search Report in Application No. 17184636.3, Dec. 1, 2017.

(Continued)

*Primary Examiner* — Thong Q Nguyen
(74) *Attorney, Agent, or Firm* — Weiss & Arons LLP

(57) ABSTRACT

Rotational alignment apparatus and methods for interchangeable loupe telescope(s) are provided. Some embodiments include an indexing ring including a projection. The ring is fixed to the telescope upon rotational alignment of the telescope. The alignment may involve use of a laser and test fixture. The projection mates with a corresponding indexing notch of a loupe anchoring device. Loupes may comprise one or more anchor assemblies, and one or more interchangeable telescope assemblies. The interchangeable telescope assemblies are held to the anchor assemblies by magnetic attraction between one or more magnets and/or one or more magnetic components affixed to corresponding surfaces of the corresponding assemblies. Mating of the projection with the notch ensures appropriate relative rotational alignment of the assemblies.

15 Claims, 13 Drawing Sheets

Related U.S. Application Data

(60) Provisional application No. 62/477,558, filed on Mar. 28, 2017.

(51) Int. Cl.
*G02B 25/00* (2006.01)
*G02C 3/04* (2006.01)
*G02C 7/08* (2006.01)

(58) Field of Classification Search
CPC ...... G02B 25/004; G02B 25/005; G02B 7/00; G02B 7/003; G02B 7/004; G02B 7/005; G02B 7/008; G02B 7/02; G02B 7/021; G02B 7/022; G02B 7/023; G02B 7/028; G02B 7/04; G02B 7/06; G02C 7/086; G02C 7/088
USPC ................. 359/362–363, 802–830, 399–482
See application file for complete search history.

(56) References Cited

U.S. PATENT DOCUMENTS

| | | | |
|---|---|---|---|
| 4,834,525 A | 5/1989 | Vansaghi | |
| 5,499,064 A | 3/1996 | Vansaghi | |
| 5,933,287 A | 8/1999 | Muller | |
| 6,006,630 A | 12/1999 | Vasichek et al. | |
| 6,967,794 B2* | 11/2005 | Luthardt | G03B 17/14 359/830 |
| 7,726,810 B2* | 6/2010 | Politzer | G02C 7/14 351/159.58 |
| 8,045,266 B2* | 10/2011 | Nakamura | G02B 25/004 359/410 |
| 9,470,908 B1 | 10/2016 | Frankel et al. | |
| 10,877,296 B2* | 12/2020 | Lindsey | G02C 3/04 |
| 2009/0231699 A1 | 9/2009 | Nakamura | |
| 2012/0200918 A1* | 8/2012 | Rivkin | G02B 23/125 359/480 |
| 2015/0028607 A1 | 1/2015 | Kojima et al. | |
| 2015/0286076 A1 | 10/2015 | Nakamura | |
| 2018/0196282 A1 | 7/2018 | Yonezawa | |

FOREIGN PATENT DOCUMENTS

| | | |
|---|---|---|
| JP | 200375783 | 3/2003 |
| JP | 201444391 | 3/2014 |
| WO | WO9903010 | 11/1997 |
| WO | WO2013172842 | 11/2013 |
| WO | WO2017002968 | 1/2017 |

OTHER PUBLICATIONS

European Patent Office Extended European Search Report in application No. 18164612, Aug. 30, 2018.
United States Patent and Trademark Office Action in U.S. Appl. No. 15/658,691, Oct. 29, 2018.
United States Patent and Trademark Final Office Action in U.S. Appl. No. 15/658,691, Mar. 11, 2019.
China National Intellectual Property Office Action in Application No. 201810260937.0 and associated English language synopsis, Apr. 26, 2020.
European Patent Office, First Examination Report in Application No. 18164612.6, Sep. 17, 2020.
European Patent Office, Second Examination Report in Application No. 18164612.6, Aug. 18, 2022.
European Patent Office, Third Examination Report in Application No. 18164612.6, Feb. 12, 2024.
Australian Patent Office, First Examination Report in Application No. 2018202187, Apr. 1, 2022.

* cited by examiner

ROTATIONAL ALIGNMENT OF INTERCHANGEABLE LOUPES

CROSS REFERENCE TO RELATED APPLICATION

This application is a continuation of U.S. patent application Ser. No. 15/935,534, filed on Mar. 26, 2018, now U.S. Pat. No. 10,877,296, which is a nonprovisional of U.S. Provisional Application No. 62/477,558 filed on Mar. 28, 2017, all of which are hereby incorporated by reference herein in their entireties.

FIELD OF TECHNOLOGY

Aspects of the disclosure relate generally to optical devices. More specifically, the disclosure relates to wearable visual aids, particularly loupes.

BACKGROUND

Loupes devices are used to perform hands-on precision dental and surgical procedures, as well as in other areas where high resolution visual information is desirable (e.g., biology, electronics assembly and inspection, gemology, tool sharpening, or photography). Loupes provide professionals with magnified views of precision-requiring procedures while simultaneously freeing hands to perform the procedures. Dentists, surgeons and other practitioners often employ the use of binocular loupes mounted on glasses, either as flip-up types over lenses or embedded directly in specialized carrier lenses. Loupe devices may allow a practitioner to stand further away from a work area or site. Loupes can therefor improve a practitioner's posture, which, in turn, can decrease the practitioner's occupational strain (see, e.g., Friedman, Mark J. "Magnification in a restorative dental practice: from loupes to microscopes". *Compendium of Continuing Education in Dentistry*—Jamesburg, N.J.: 1995 25(1) 48, 50, 53-55).

Often, a medical, dental, or other practitioner uses different magnifications for different procedures. The practitioner may also demand increasing power as his/her career progresses. For example, a typical dental procedure may be served by a magnification of 2.5× magnification, in practice, dental loupes generally provide anywhere from 2× to 8× magnification.

Upon assembly of a lens therewithin, a telescope or ocular of a loupe device defines an optical axis. The optical axis should ideally be positioned exactly through the center of the ocular, but often may exhibit a slight deviation from the true center. Many oculars exhibit an optical axis deviation of as much as 0.5 degrees. At a typical working distance of about 18 inches, this deviation of 0.5 degrees can translate into as much as about 4 mm deviation, which can have adverse consequences when attempting to perform precision medical or other work.

To ensure optimal functionality of the loupe device or ocular, it would be desirable to minimize adverse effects of deviation on a practitioner's magnified visual field-of-view.

The present disclosure embodies solutions to the aforementioned problems. It is an object of the disclosure to provide apparatus and methods for accommodating multiple magnification levels in a loupe device that is effective, reliable, practical, and easy-to-use. It is further an object of the disclosure to provide methods and apparatus for reducing diplopia or double vision in a loupe device that includes a releasably attached telescope.

BRIEF DESCRIPTION OF THE DRAWINGS

The objects and advantages of the disclosure will be apparent upon consideration of the following detailed description, taken in conjunction with the accompanying line drawings, in which like reference characters refer to like parts throughout, and in which.

DETAILED DESCRIPTION OF THE DISCLOSURE

Figure 1:
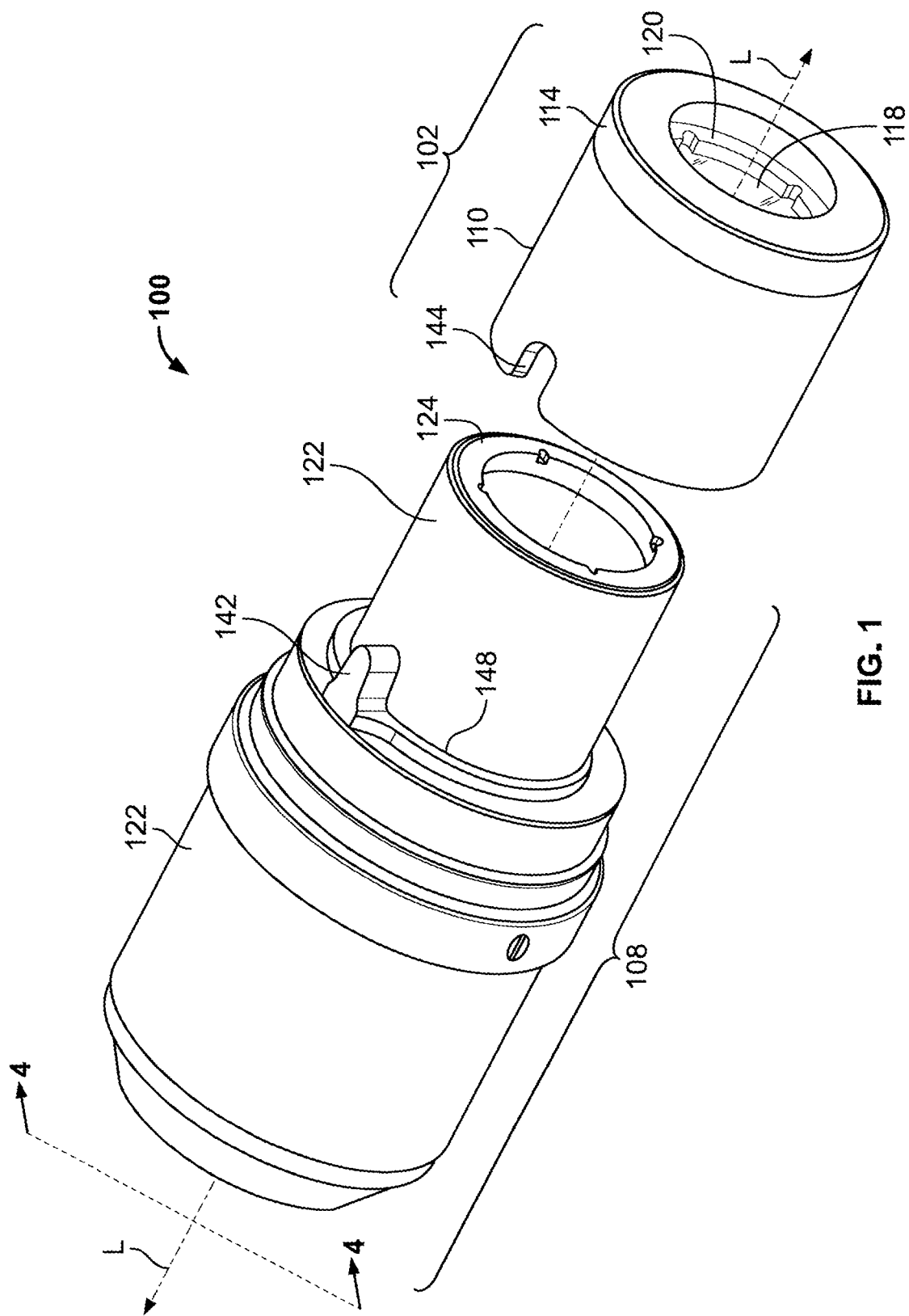
FIG. 1 shows illustrative apparatus in accordance with the principles of the disclosure.

In a first aspect, the present disclosure provides an interchangeable loupe device comprising: an anchor (or alternatively, anchoring) assembly; a telescope assembly defining a central longitudinal axis, an optical axis and a field-of-view plane, the field-of-view plane having a horizontal axis and a vertical axis and wherein the optical axis deviates from the central longitudinal axis, and the telescope assembly is rotatable about the central longitudinal axis to an orientation such that deviation of the optical axis is oriented along the horizontal axis of the field-of-view plane; and wherein the telescope assembly comprises a geometric feature that is configured to mate with a corresponding geometric feature in the anchor assembly and thereby fix orientation of the deviation of the optical axis along the horizontal axis.

Preferred features include: wherein deviation of the optical axis is sufficient to cause more than 0.5 prism diopters of vertical imbalance to a practitioner using the interchangeable loupe device at a working distance of 0.3 to 0.7 meters.

Preferred features include: wherein the geometric feature comprises a protrusion and the corresponding geometric feature comprises a notch configured to receive the protrusion.

Preferred features include: wherein the telescope assembly is held to the anchor assembly by magnetic attraction between a first magnetic element of the telescope assembly and a second magnetic element of the anchor assembly.

Preferred features include: wherein the first magnetic element comprises a steel ring.

Preferred features include: wherein the steel ring comprises the geometric feature.

Preferred features include: wherein the steel ring is configured to be fixed to the telescope assembly after orienting deviation of the optical axis along the horizontal axis.

Preferred features include: wherein the geometric feature is externally visible after the geometric feature of the telescope assembly mates with the corresponding geometric feature of the anchor assembly.

Preferred features include: wherein the telescope assembly is a first telescope assembly, the loupe device further comprising a second telescope assembly.

Preferred features include: wherein the first telescope assembly provides a first magnification level; and the second telescope assembly provides a second magnification level.

Preferred features include: wherein the first telescope assembly is configured to mate with the anchor assembly; and the second telescope assembly is configured to mate with the anchor assembly.

Preferred features include: wherein the anchor assembly is a first anchor assembly; the first telescope assembly is configured to mate with the first anchor assembly; and the second telescope assembly is configured to mate with a second anchor assembly.

In a second aspect, the present disclosure provides: a loupe device for magnifying an object, the loupe device having a proximal end and a distal end and comprising: a frame comprising: a carrier lens; and an anchor assembly; an interchangeable telescope assembly having a weight and defining a field-of-view plane, the interchangeable telescope assembly comprising at least one magnification lens and configured to mate with the anchor assembly, wherein mating of the interchangeable telescope assembly and the anchor assembly prevents rotation of the telescope assembly relative to the anchor assembly; wherein: upon a mating of the interchangeable telescope assembly and the anchor assembly: the interchangeable telescope assembly is held to the anchor assembly by magnetic attraction; an indexing ring affixed to the interchangeable telescope assembly orients the interchangeable telescope assembly relative to the anchor assembly such that deviation of an optical axis of the telescope is oriented along a horizontal axis of the field-of-view-plane.

Preferred features include: wherein the interchangeable telescope assembly comprises at least one magnetic element and the anchor assembly comprises at least one magnetic element.

In a third aspect, the present disclosure provides: a loupe device for magnifying an object spaced apart from the loupe device, the loupe device comprising: an anchor assembly comprising: an anchor body having a first geometric feature and a first magnetic element; and an interchangeable telescope assembly, comprising: a magnification lens; a second magnetic element; and an indexing ring comprising a second geometric feature configured to mate with the first geometric feature, wherein: the interchangeable telescope assembly is configured to be held to the anchor assembly by magnetic attraction between the first magnetic element and the second magnetic element; and the second geometric feature, when mated with the first geometric feature, rotationally fixes the interchangeable telescope assembly with respect to the anchor assembly.

Preferred features include: wherein the second geometric feature, when mated with the first geometric feature, rotationally fixes the interchangeable 'telescope assembly with respect to the anchor assembly such that any deviation associated with an optical axis of the interchangeable telescope assembly is fixed in a pre-defined orientation.

Preferred features include: wherein the pre-defined orientation substantially eliminates diplopia when viewing the object through the interchangeable telescope assembly.

In a fourth aspect, the present disclosure provides: a method of manufacturing a loupe system, the loupe system comprising an anchor assembly and an interchangeable telescope assembly, the interchangeable telescope assembly having a proximal end configured to be releasably fixed to a distal end of the anchor assembly, the method comprising the steps of: determining an alignment of an optical axis of the interchangeable telescope assembly that minimizes vertical deviation of the optical axis; and fixing an indexing ring to the interchangeable telescope assembly, such that the indexing ring positions the interchangeable telescope assembly, when the interchangeable telescope assembly is releasably fixed to the anchor assembly, in the alignment that minimizes vertical deviation of the optical axis.

Preferred features include: wherein the determining includes laser aligning the optical axis using a test fixture.

Preferred features include: forming a projection in the indexing ring and forming a notch in the anchor assembly, the notch configured to receive the projection.

Preferred features include: forming a notch in the indexing ring and forming a projection in the anchor assembly, the projection configured to mate with the notch.

Practitioners (e.g., medical professionals) typically require different magnification power when performing different procedures. Practitioners may demand increasing magnification power as their career progresses. Apparatus and methods described herein allow practitioners to quickly change oculars (a telescope assembly) when using a loupe device. A telescope assembly may be held to an anchor assembly by magnetic attraction and thereby allowing the telescope assembly to be easily swapped in or out of the anchor assembly.

Preferably, loupe devices can be interchangeable. Interchangeable loupe devices allow for multiple oculars to be used with a single carrier or anchor assembly. Each ocular may provide a different level of magnification. Each ocular may be used by a practitioner during a different phase of a procedure. The carrier allows different oculars to be swapped in and out during the procedure.

In the case of interchangeable loupe devices, it may be necessary to maintain alignment of movable telescopes, during a procedure. For example, an interchangeable ocular may unintentionally rotate within its anchoring base during use. Rotation may trigger diplopia or double vision for the user. Diplopia or double vision disorients the user and interrupts an ongoing procedure.

Compound optical systems such as a telescope assembly typically have an optical axis that runs through a center of the telescope assembly. However, the optical axis may have a slight deviation from the true center. For example, the deviation may be 0.5° deviation from the true center. At a distance of 18 inches (the average working distance of practitioners), the deviation may be as much as 3.9 millimeters ("mm"). It would be preferable to align or orient any such deviation along a horizontal axis (as opposed to the vertical axis) of the field-of-view plane provided by the telescope assembly. Accordingly, it would be desirable to index/orient any such optical axis deviation.

Apparatus and methods may include an indexing feature affixed to a telescope assembly. The indexing feature may mate with a corresponding indexing feature in the anchor assembly that holds the telescope assembly. Mating of the indexing features preferably insures that the telescope assembly is properly oriented. Without indexing of the telescope assembly, the telescope assembly may rotate within the anchor assembly. Rotation of the telescope assembly within the anchor assembly may allow optical axis deviation to be oriented along a vertical axis of the field-of-view plane. Optical axis deviation that is oriented along a vertical axis of the field-of-view plane may cause diplopia, (double vision) and vertical imbalance. A typical practitioner may adjust to about 0.5 prism diopters (0.56) of vertical imbalance. Indexing any deviation along the horizontal axis of the field-of-view plane preferably eliminates any such vertical imbalance due to optical axis deviation.

Preferably, an anchor assembly is mounted onto a carrier lens of an eye glass frame. The anchor assembly may be positioned on the carrier lens such that it is focused at a point in space at a practitioner's desired working distance. The anchor assembly may accommodate a corrective (e.g., prescription) lens inside it to correct a deficiency in the practitioner's vision. The anchor assembly preferably contains magnetic elements.

A telescope assembly is preferably configured such that when it is mounted on the anchor assembly, the telescope assembly is focused at a point in space at a practitioner's desired working distance. The telescope assembly is preferably equipped with a magnetic element that adheres to magnetic elements affixed to the anchor assembly. The telescope assembly is preferably held in place by an attractive force between the magnetic elements. A pull force is typically required to remove the telescope assembly from the anchor assembly.

The telescope assembly is preferably aligned using a test fixture and rotated to ensure that any optical axis deviation is oriented along a horizontal axis of the practitioner's field-of-view. The telescope assembly preferably includes an indexing feature. The indexing feature is configured to mate with a corresponding feature in the anchor assembly. The indexing feature is preferably affixed to the telescope assembly after it has been aligned. Thus, the indexing feature preferably ensures that when the telescope assembly is removed from the anchor assembly and/or reinserted into the anchor assembly, the optical axis of the telescope assembly is aligned to eliminate or reduce any vertical imbalance.

Apparatus and methods for rotationally aligning an optical device, such as an ocular of an interchangeable loupe, are provided. Deviation present in the ocular may be oriented in a vertical plane. Orientation of the deviation in the vertical plane may trigger vertical imbalance and diplopia or double vision. Many practitioners only adjust to about 0.5 prism diopters (0.56) of vertical imbalance. The present disclosure provides methods and apparatus that minimize, eliminate or prevent vertical imbalance, particularly in interchangeable telescopes or oculars.

The apparatus may include, and the methods may involve, one or more assemblies of components configured to be held together by magnetic attraction or other suitable releasable engagement mechanisms. Apparatus may include, and the methods may involve, one or more than one loupe anchor (alternatively described as a sleeve) or anchoring assembly (alternatively described as a sleeve assembly) and one or more than one interchangeable loupe telescope (alternatively described as an ocular or telescope assembly).

Preferably, apparatus and methods disclosed herein enable a user to quickly change the ocular(s) or telescope(s) (hereinafter, "telescope") releasably affixed to magnetic sleeve(s)/anchor(s). The telescope/assembly preferably includes one or more magnification lens. The telescope is preferably configured for replaceable insertion into an anchor assembly. The telescope is preferably configured for replaceable removal from the anchor assembly.

Preferably, when the telescope is seated in the anchor assembly, the telescope is configured to be held to the anchor assembly by magnetic attraction therebetween. Magnetic attraction is provided by one or more magnets interacting with one or more magnetic elements. The magnets and/or the magnetic elements are configured such that the attraction is sufficient to withstand a typical unintentionally applied force that could cause the telescope to disengage from the anchor. The force includes gravitational force on the loupe device. The weight of the telescope may determine the configuration of the magnets and magnetic elements needed to at least overcome the gravitational force.

Optionally, a telescope includes the one or more magnets, and the anchor assembly includes the one or more magnetic elements oriented and configured to provide the magnetic attraction. Alternatively, or additionally, the telescope includes the one or more magnetic elements, and the anchor assembly includes the one or more magnets oriented and configured to provide the magnetic attraction.

Preferably, the shape and size of magnetic elements are selected such that they are easily manufactured. The shape and size of magnetic elements are selected such that they easily mate with other components of the loupe assembly. For example, magnetic elements may include curved surfaces that conform within corresponding circular recesses of one or more than one loupe subassembly (e.g., anchor covers and anchor bodies). Preferably, magnetic elements have elongated cylindrical shapes. The elongated cylindrical shapes have proximal and distal ends "Proximal" and "distal" may be defined with respect to a practitioner wearing the loupe device. Proximal may be closer to the practitioner and distal may be more distant from the practitioner. The proximal and distal ends may define a longitudinal axis.

Magnetic elements may be of any suitable length. Illustrative lengths include about 2 mm to about 3 mm, about 3 mm to about 4 mm, about 4 mm to about 5 mm, about 5 mm to about 6 mm, about 6 mm to about 7 mm, about 7 mm to about 8 mm and/or about 8 mm to about 9 mm. Cylindrical magnetic elements may be of any suitable diameter, such as about 1 mm to about 2 mm, about 2 mm to about 3 mm, about 3 mm to about 4 mm, about 4 mm to about 5 mm, about 5 mm to about 6 mm, about 6 mm to about 7 mm, about 7 mm to about 8 mm and/or about 8 mm to about 9 mm.

Preferably, the magnetic elements include surfaces configured to conform, upon assembly of the loupe subassemblies, to corresponding surfaces of other magnet elements. Preferably, a magnetic element comprises a steel ring. Preferably, the steel ring includes a flat surface that is configured to conform to the flat surface(s) of other magnet elements. The steel ring defines a hole therein that avoids occluding a line of site through the assembled loupe device.

Preferably, the magnets are positioned about longitudinal axes of the telescope assemblies. Corresponding one or more magnetic elements are positioned on the anchor assembly. Attraction between the magnets and the magnetic elements maintains the telescope assembly and anchor assembly in fixed positions with respect to each other.

Preferably, telescope assemblies are configured to be adjustable to the practitioner's desired working distance. For example, telescopes may include corrective lenses. Anchor assemblies may feature binocular-vision convergence adjustment for focus and/or eye-teaming on a field of vision at the desired working distance. The convergence adjustment may be configured to eliminate some or all of deviation(s) of optical axes of the telescope assemblies, when the deviation(s) are oriented along a horizontal plane.

Magnets and magnetic elements are preferably of suitable materials and geometries provide sufficient magnetic force to secure the telescope assemblies to the anchor assemblies in a dependable manner. Preferably, attraction between the magnets and the magnetic elements provides a magnetic field strong enough to reliably hold the telescope assembly relative to the anchor assembly despite inadvertent forces applied to the telescope or anchor assembly. The telescope and anchor assembly should remain adjoined despite, for example, the practitioner inadvertently brushing the telescope assembly against a wall or other object.

Optionally, magnetic elements are positioned in the anchor assembly so as to abut the magnetic element of the telescope assembly. For example, optionally, the magnetic elements are partially occluded distally by a magnet-retaining lip. Such an arrangement provides for direct contact of the magnetic elements in the anchor assembly with the magnetic elements of the telescope assembly.

Optionally, the magnetic elements have a geometry that is narrower, tapered or conical and allows the magnetic elements of the anchor assembly to be seated within a corresponding recess. The corresponding recess may hold the magnetic elements of the anchor assembly in position and allow the magnetic elements of the telescope assembly to directly contact the magnetic elements of the anchor assembly. Such direct contact may provide a stronger adhesion between the magnetic elements.

Magnetic elements may have a suitable geometry configuration that, for example, is narrower at a distal end (such as a conical section). Preferably, such geometric configurations allow for substantially simultaneous retention of the magnet(s) within a geometrically conforming, magnet-retaining recess of the anchor assembly and direct contact with the magnetic element(s) of the telescope assembly.

Any suitable material for magnetic elements includes iron or its alloys, cobalt or its alloys, and/or nickel or its alloys. Any suitable material for magnets includes iron or its alloys, cobalt or its alloys, nickel or its alloys, lodestone, rare earth metal compounds and/or alloys, rare-earth-free permanent magnets or nanostructured magnets.

Preferably, the magnetic elements provide adhesion of a suitable strength to prevent inadvertent release of the loupe subassemblies, while allowing intentional separation of the loupe subassemblies. For example, preferably, the magnets include neodymium (NdFeB) of a suitable grade, such as N35, N38, N40, N42, N45, N48, N50, N52 and/or N55.

Optionally, one or more releasable mechanical engagement features releasably couple telescope assembly to the anchor assembly. Such engagement features include any suitable geometries or structures, such as projections, grooves, ridges, tracks, locks or hooks. For example, complementarily contoured mechanical engagement structures on the anchor and telescope assemblies replace or supplement magnetic attraction between the assemblies. Additional examples of engagement features include protrusions, notches, latches, threads, eyes, holes, pegs, hook-and-loop fasteners, or any other mechanical system of releasable engagement. Optionally, mechanical engagement structures, features and/or mating geometries are positioned about a longitudinal axis of the telescope assembly and/or anchor assembly.

Preferably, magnetic or mechanical couplings provide one or more specific rotational orientations of the telescope assembly with respect to its corresponding anchor assembly. Optionally, the telescope/anchor assemblies are configured to allow for multiple rotational orientations. For example, each telescope assembly may have two geometric projections on its proximal side each of which is configured to mate with mate one of two complementary geometric recesses on a distal side of the anchor assembly. This arrangement enables assembly of the telescope assembly to the anchor assembly in two possible orientations.

Optionally, each orientation may differ by 180 degrees from the other. Multiple orientations minimize vertical deviation of the optical axis while allowing for flexibility in positioning the telescope assembly relative to the anchor assembly. Optionally, multiple engagement features provide added stability. Preferably, the telescope assembly(ies) and/or the anchor assembly(ies) are configured to allow only one rotational orientation.

The apparatus may include, and the methods involve, indexing deviation present in the telescope assembly into a horizontal plane. The horizontal plane may be considered "horizontal" with respect to a field of view of the practitioner wearing the loupe device. Indexing the deviation into the horizontal plane reduces vertical imbalance. Preferably, indexing is provided by the mechanical structures, geometries or features. Preferably, telescope assemblies include one or more indexing rings (alternatively described as an aligning ring[s]). The indexing ring(s) is configured to prevent vertical deviation of the telescope assembly. Preferably, the indexing ring(s) includes one or more of the mechanical features or structures.

Preferably, the indexing ring is positioned and fixed to align the structure(s)/feature(s)/geometry to complementarily contoured indexing feature(s), such as notch(es), in the anchor assembly. The indexing features align the telescope assembly in predetermined orientation(s) relative to the anchor assembly.

The indexing ring may include one or more than one magnetic elements or mating geometric features. Illustrative mating geometric features include projections or ridges configured to mate with a complementary feature formed in the anchor assembly. For example, the indexing ring may include a recess configured to mate with a complementarily contoured ridge of an anchor assembly.

The indexing ring is constructed from any suitable material. Suitable materials include metal and/or a polymer. The indexing ring may be fixed to the telescope assembly/body using adhesive. One or more than one bead of the adhesive may be placed around the indexing ring positioned to interface with a surface of the telescope body. Alternatively, or additionally, the indexing ring may be fixed to the telescope assembly using welding or any other suitable fixation methods that resist or prevent rotation of the telescope assembly relative to the indexing ring. Suitable fixation methods include mechanical fixation, such as via screws and complementarily threaded bores.

Preferably, the indexing ring includes a feature that mates with a corresponding feature on the anchor assembly such that, when assembled, the telescope assembly is rotationally fixed with respect to the anchor assembly. The feature of the indexing ring is configured to ensure that, when the telescope and anchor assemblies are properly adjoined, any deviation that is inherently associated with the telescope assembly is oriented in the horizontal plane of the practitioner's field of view.

Preferably, the indexing ring includes a projection for mating with a complementarily contoured notch in the anchor assembly. Alternatively, or additionally, the indexing ring includes the notch and the anchor includes the projection. An indexing ring may include any suitable feature that, when the telescope assembly is inserted into the anchor assembly, fixes rotational movement of the telescope assembly with respect to the anchor assembly.

Optionally, a geometric feature is formed in a surface of the telescope assembly itself. Preferably, a loupe device(s) include(s) a first telescope/anchor assembly pair and a second telescope/anchor assembly pair. Preferably, the telescope assembly of the first telescope/anchor assembly pair includes the mating feature in an outer surface of the telescope assembly. Preferably, the telescope assembly of the second telescope/anchor assembly pair includes an indexing ring.

Preferably, the apparatus and/or device are configured such that the mating features are visible prior to insertion of the telescope assembly into the anchor assembly. Preferably, the apparatus and/or device are configured such that the mating features are visible after insertion of the telescope assembly into the anchor assembly. For example, optionally, a mating projection may be taller than a thickness of a corresponding notch configured to receive the projection. Preferably, a notch or recess traverses an anchor wall from the exterior of the anchor wall to the interior of the anchor wall, thereby enabling a viewing of the projection inserted in the notch. Optionally, a transparent or translucent material may cover the projection after its insertion into the notch.

Preferably, the indexing ring is fixed to the telescope assembly after rotationally aligning an optical axis of the telescope assembly. Preferably, rotational alignment of the telescope assembly includes orienting the optical axis such that when inserted into an anchor assembly, vertical deviation is substantially reduced or eliminated. Preferably, rotational alignment includes laser aligning the optical axis with respect to a test anchor assembly. Preferably, rotational alignment includes positioning and fixing the indexing ring relative to the optical axis to ensure that when the telescope assembly is inserted into the anchor assembly, any optical deviation in the vertical plane is minimized, having been shifted to the horizontal plane. Rotational alignment of the indexing ring ensures that the optical axis, when the telescope assembly is inserted into the anchor assembly, is oriented to minimize or eliminate vertical deviation.

Preferably, the indexing ring is fixed to the telescope assembly in any suitable manner or using any suitable materials. For example, the indexing ring may be fixed to the telescope assembly using a glue or and/or bolting the indexing ring to the telescope assembly. One or more geometric features, such as lips, ridges, rims, protrusions or recesses, may be utilized to fix the indexing ring in a position on the telescope assembly relative to the optical axis.

Preferably, illustrative telescope assemblies include a proximal end configured to nest within an anchor assembly. Preferably, when nested, magnets and/or magnetic elements of the telescope assembly are positioned to provide magnetic attraction with corresponding magnets and/or magnetic elements of the anchor assembly. Preferably, the magnetic attraction holds the telescope and anchor assemblies in a nested configuration. Preferably, magnets and/or magnetic elements are positioned on the facing ends of the telescope and anchor assemblies such that when the telescope assembly is seated in the anchor assembly, the magnets and/or magnetic elements of the different assemblies are in proximity of, and/or abut, each other.

Preferably, magnets and/or magnetic elements are positioned on the proximal end of the telescope assembly and on the distal side of the anchor assembly. Optionally, the magnets and/or magnetic elements are inserted within the end(s) of the telescope and/or anchor assemblies). Magnets and/or magnetic elements may protrude from the ends of the telescope and/or anchor assemblies. Magnets and/or magnetic elements may be flush with the ends of the telescope and/or anchor assemblies. Magnets and/or magnetic elements may be recessed within the facing ends of the telescope and/or anchor assemblies.

Preferably, magnets and/or magnetic elements are fixed to the telescope and anchor assemblies using any suitable methods or mechanisms. Preferably, a threaded screw is driven through holes in both an anchor assembly body and an anchor assembly cover thereby fixing magnets and/or magnetic elements to the anchor assembly. Optionally, magnets and/or magnetic elements are fastened using an adhesive. Geometric features, such as lips, ridges, grooves, rims, threads, hooks, latches, protrusions or recesses may hold magnets and/or magnetic elements in position in one or more directions, on a telescope or anchor assembly.

For example, geometric features may allow magnets and/or magnetic elements to be snapped into or out of a position. Optionally, magnets and/or magnetic elements may be releasably secured to the telescope and/or anchor assembly. Such aspects may allow magnets and/or magnetic elements of different attraction strengths to be swapped in or out. For example, a practitioner may desire a more secure adhesion of the telescope and anchor assemblies. The practitioner may obtain magnets and/or magnetic elements having a stronger attraction (e.g., magnetic field) and replace with them more weakly attracting magnets and/or magnetic elements.

Magnetic elements include any substance suitable of being acted upon by a magnetic field. The magnetic element(s) may have any shape suitable to provide an unobstructed line of sight through nested telescope and anchor assemblies. The magnetic elements may have any suitable shape or composition to provide a strong attraction between the telescope and anchor assemblies. Illustrative shapes include ring shaped and/or multiple magnetic elements positioned around an edge of a telescope or anchor assembly.

Optionally, a body of the telescope and/or anchor assembly is constructed from a magnetic element (e.g., steel). The body is constructed of a magnetic element having a suitable strength and/or contour to be held by the magnetic element of a complementary assembly. Optionally, the indexing ring is constructed from a magnetic element.

Optionally, mechanical features hold the telescope and anchor assemblies in the nested position. Such mechanical features may supplement magnetic attraction.

Preferably, a telescope assembly is positioned such that the optical axis is focused at a desired point in space at a practitioner's desired working distance. Preferably, a pair of anchor assemblies is embedded in a carrier device. The carrier device may include a frame with lenses. The anchor assemblies are embedded in the lenses of the frame. Optionally, the anchor assemblies may be fixed to a flip-up, hinged device attached to the frame.

Preferably, the lenses of the frame include one or more lenses that correct vision of a practitioner. For example, the frame lenses may accommodate a corrective lens to correct the practitioner's eyesight defect (e.g., near-sightedness, far-sightedness or astigmatism).

Preferably, the anchor assembly includes one or more corrective lenses. For example, the anchor assembly may accommodate a corrective lens to correct the practitioner's eyesight. The telescope assembly may accommodate a corrective lens to correct the practitioner's eyesight.

Optionally, two or more telescope assemblies may be nested within each other. One telescope assembly may correct the practitioner's vision and the other may provide magnification suitable for the specific procedure being performed by the practitioner. Optionally, two or more anchor assemblies may be nested within each other. One anchor assembly may correct the practitioner's vision and the other may provide a base for receiving a telescope assembly.

Any suitable fastening mechanisms may be used to fix corrective lens to an assembly or frame. For example, one or more retaining rings may trap a corrective lens against an inwardly protruding surface (such as a lip), thereby holding the corrective lens in place between the ring and the protruding surface. Corrective lenses may be held in position using adhesive.

Some aspects of the disclosure may omit accommodations for corrective lenses. The lenses of the frame may be "window-glass" lenses that do not correct vision.

The apparatus may include, and the method may involve, a binocular loupe system. Preferably, the binocular loupe system is configured to magnify an object during a procedure. Preferably, the loupe system is configured to prevent or reduce diplopia.

Preferably, the system includes a pair of the loupe devices, a carrier lens frame and a pair of carrier lenses. The loupe devices are configured to be positioned relative to the carrier lenses. Preferably, the loupe device includes an interchangeable telescope assembly. The carrier lenses, in turn, are attached to the carrier lens frame. The carrier lenses include an anchor assembly. The anchor assembly is configured to hold an interchangeable telescope assembly in position.

The apparatus may include and the methods may involve a binocular loupe system for magnifying an object during a procedure. Preferably, the anchor apparatus includes a carrier lens frame, a pair of carrier lenses and a pair of anchor assemblies. Each anchor assembly is fixed to a carrier lens.

Anchor assemblies preferably include an anchor body. The anchor body preferably includes one or more cylindrical magnetic elements, an anchor cover and fasteners fixing the anchor cover to the anchor body about the cylindrical magnets. Preferably, the anchor body includes a corrective lens and a ring for retaining the corrective lens.

The system preferably includes one or more pairs of interchangeable telescope assemblies. Each pair of telescope assemblies preferably includes a telescope assembly. One or more indexing rings are assembled and/or fixed to each telescope assembly. Proximal-end surfaces of the indexing rings preferably include geometric features, such as projections. The geometric features are preferably configured to align and mate with features with complementary geometric features (such as notches complementary in shape with the projections) on a distal-end surface of the anchor assembly. When the telescope assembly is nested within to the anchor assemblies, the telescope assembly is rotationally fixed with respect to the anchor assembly. Preferably, an interchangeable telescope assembly is held to an anchor assembly by magnetic attraction. Optionally, an anchor assembly is nested within a telescope assembly.

The apparatus may involve, and the methods may include, a method of manufacturing a binocular loupe system. Preferably, the binocular loupe system includes a carrier lens frame, a pair of carrier lenses and a pair of anchor assemblies fixed relative to the carrier lenses.

Preferably, each anchor assembly includes an anchor body, one or more magnetic elements, an anchor cover and one or more fasteners for fixing the anchor cover to the anchor body about the magnets. Each anchor assembly may also include a corrective lens. Each anchor assembly may also include a retaining ring and/or any other suitable means for securing the corrective lens to the anchor assembly. The corrective lens may be held in position by surfaces of the anchor body and/or the anchor cover.

Preferably, the binocular loupe system includes a pair of interchangeable telescope assemblies. The telescope assemblies have proximal ends configured for releasable assembly to distal ends of the anchor assemblies. The telescope assemblies include interchangeable telescopes, magnetic elements and one or more than one rotational indexing ring(s). Preferably, an external geometry of the indexing ring(s) is configured to align and mate with a complementary external geometry of the anchor assembly.

Preferably, the method includes affixing the carrier lenses to the carrier frames. Preferably, the method includes inserting the magnets into a body of the anchor assembly. Preferably, the method includes threading the fasteners through the anchor body and the anchor cover. Preferably, the method includes inserting the corrective lens into the anchor body. Preferably, the method includes affixing the corrective lens retaining ring into the anchor cover and/or the anchor body. Optionally, the lens retaining ring is omitted. Preferably, the method includes securing the corrective lens between the anchor body and the anchor cover. Optionally, the anchor cover secures the corrective lens to the anchor body. Preferably, the method includes affixing the anchor assemblies into the carrier lenses. Preferably, the method includes affixing magnetic elements into an interchangeable telescope assembly.

Preferably, the method includes affixing an indexing ring(s) to the telescope assembly such that geometric features are positioned to mate with corresponding geometric features of an anchor assembly. Preferably, the method includes affixing the indexing ring(s) to the telescope assembly such that an optical axis of the telescope assembly is aligned with the corresponding geometric features of the anchor assembly. Preferably, the method includes rotationally aligning the optical axis of telescope assembly to reduce vertical deviation. Preferably, the method includes fixing the indexing rings to the telescopes to minimize the vertical deviation of the optical axes of the telescopes upon assembly of the telescope assembly to the anchor assembly.

The apparatus may involve, and the methods may include, a method of manufacturing a telescope assembly. Preferably, the telescope assembly includes a proximal end configured to be inserted into an anchor assembly held by a carrier lens. Preferably, the method includes inserting an indexing ring over, in, on or about a body of the telescope assembly such that an indexing geometric feature of the indexing ring or magnetic surface of the indexing ring is configured to mate with a complementary geometry or corresponding surface of the anchor assembly.

For example, a geometric contour (such as a projection) of a proximal-facing surface of the indexing ring may positioned on the telescope assembly body such that the geometric contour faces in a proximally direction. Such positioning enables the geometric contour to mate with a complementary geometric surface (such as a notch) of a distal-facing surface of the anchor assembly.

The apparatus may involve, and the methods may include, a method of rotational alignment of the one or more than one telescope device. Preferably, the method includes rotating the telescope assembly about a central longitudinal axis of each telescope assembly. Preferably, the method includes rotating the indexing ring about the central longitudinal axis. Preferably, the method includes rotating the telescope assembly, about the central longitudinal axis, with respect to the indexing ring. Preferably, the method includes fixing the indexing ring to the telescope assembly. Optionally, a test anchor assembly is used during manufacture of the telescope assembly to test the alignment. Preferably, a laser is used for determining/checking the alignment of the telescope assembly.

The apparatus may involve, and the methods may include, a method of releasably assembling a loupe device. Preferably, the method includes aligning one or more of the geometries of a telescope assembly with the complementary geometries of an anchor assembly. Preferably, the method includes nesting the telescope assembly and anchor assembly. Preferably, the method includes joining the telescope assembly to the anchor assembly. Preferably, the method includes inserting the telescope assembly into, onto and/or about the anchor assembly. Preferably, the method includes inserting the telescope assembly into, onto and/or about the anchor assembly such that a magnetic attraction or mechanical force between the assemblies reduces a risk of inadvertent disassembly of the loupe device.

The apparatus may involve, and the methods may include, a method of using a loupe device. Preferably, the method includes a practitioner using an assembled loupe device (e.g., nested telescope and anchor assemblies) to view a magnified image of a surface. Preferably, the method includes using an assembled loupe device to perform a medical/dental procedure. Preferably, the method includes removal of a telescope assembly from the loupe device. For example, a first pair of telescope assemblies may have a first magnification level. Preferably, the method includes removing the first pair of telescope assemblies from their anchor assemblies. Preferably, the method includes inserting a second pair of telescope assemblies into the anchor assemblies. Preferably, the second pair of telescope assemblies has a magnification level that is different from the first pair of telescope assemblies.

Apparatus and methods described herein are illustrative. It is to be understood that other embodiments may be utilized and structural, functional and procedural modifications may be made without departing from the scope and spirit of the present disclosure.

Apparatus and methods of the disclosure may involve and/or include some or all of the features of the illustrative apparatus and/or some or all of the steps of the illustrative methods. Apparatus and methods of the disclosure may combine some or all of the features of some or all of the illustrative apparatus and/or some or all of the steps of some or all of the illustrative methods.

The steps of the methods may be performed in an order other than the order shown and described herein. Some embodiments may omit steps shown and described in connection with the illustrative methods. Some embodiments may include steps that are not shown and/or are not described in connection with the illustrative methods. Some embodiments may omit features shown and described in connection with the illustrative apparatus. Some embodiments may include features that are not shown and/or are not described in connection with the illustrative apparatus.

Apparatus and methods in accordance with the disclosure will now be described in connection with the FIGs. The FIGs. show illustrative features of apparatus and methods in accordance with the principles of the disclosure. The features are illustrated in the context of a selected embodiment or embodiments.

FIG. 1 shows loupe subassembly 100 defining longitudinal axis L. Loupe subassembly 100 includes anchor subassembly 102 and corresponding interchangeable telescope subassembly 108. Telescope subassembly 108 is shown aligned for insertion into anchor subassembly 102.

Anchor subassembly 102 includes anchor body 110. Anchor subassembly 102 includes anchor end cover 114. Anchor subassembly 102 includes corrective lens 118. Anchor subassembly 102 includes lens retaining ring 120. Anchor body 110 defines indexing notch 144 at a distal end thereof.

Telescope subassembly 108 includes telescope body 122. Telescope subassembly 108 includes magnetic element 124. Magnetic element 124 may comprise a steel ring. Telescope subassembly 108 includes indexing ring 148. Indexing ring 148 includes indexing projection 142. Indexing projection 142 is configured to mate with indexing notch 144 of anchor subassembly 102.

Figure 2:
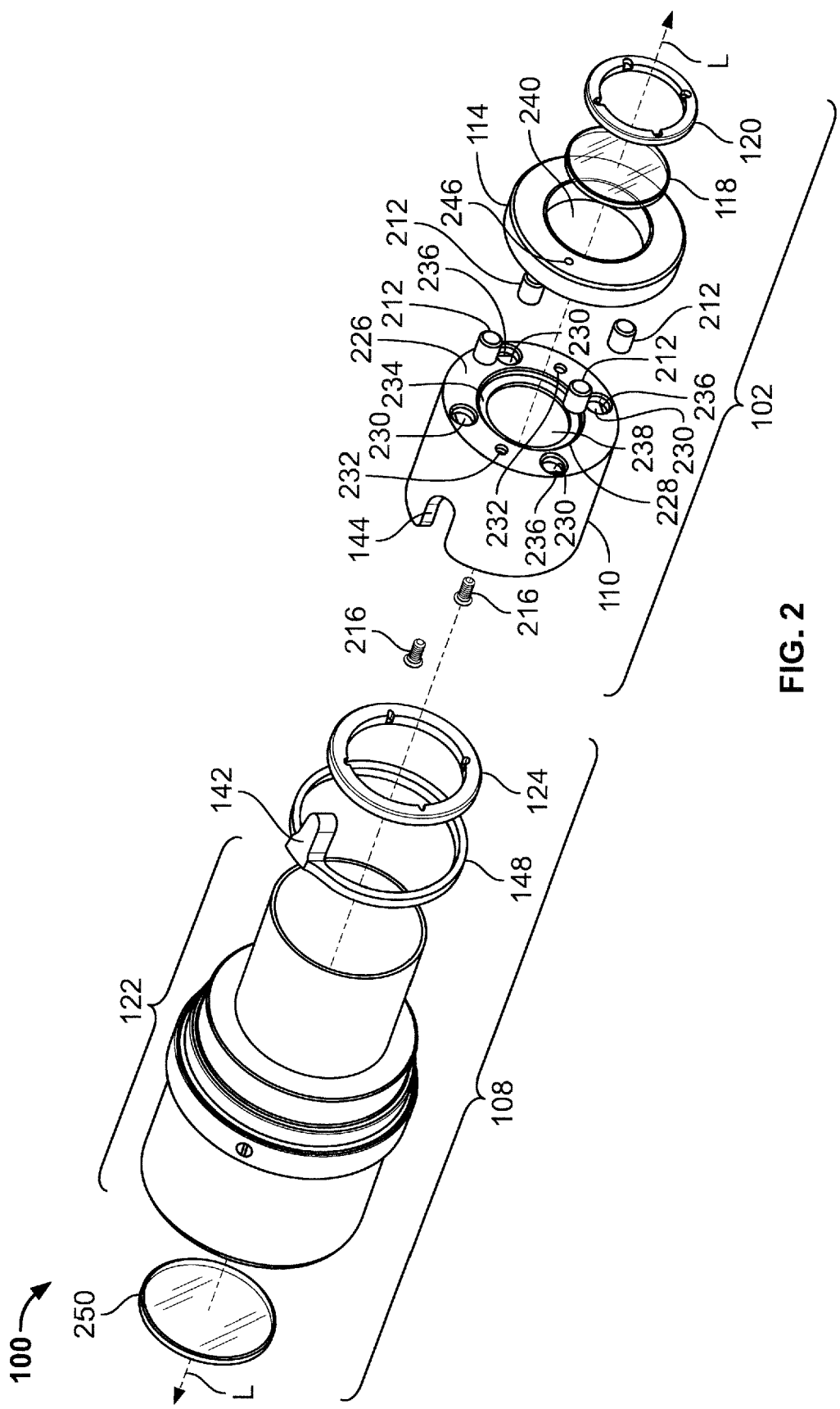
FIG. 2 shows an illustrative exploded view of apparatus shown in FIG. 1.

FIG. 2 shows components of loupe subassembly 100. Loupe anchor subassembly 102 includes magnets 212. Anchor subassembly 102 includes fasteners 216 fixing anchor cover 114 to anchor body 110 about magnets 212. Telescope subassembly 108 is configured to be held to anchor subassembly 102 by magnetic attraction between magnets 212 and magnetic element 124.

To ensure that the magnetic attraction is sufficient for facilitating reliable fixation of telescope subassembly 108 within anchor assembly 102, geometries and substance(s) of magnets 212 are chosen to insure a reliably strong magnetic field and level of magnetic attraction. To this end, magnets 212 are shaped as elongated cylinders.

Fasteners 216 include threaded screws fixing anchor cover 114 to anchor body 110 about magnets 212. Alternatively, or additionally, adhesive or other methods of fixation may be implemented.

Anchor body 110 may be of a rigid and cylindrical construction with a proximal and a distal end. The proximal end of anchor body 110 includes inwardly extending annular lip 226. Annular lip 226 defines axially-centered lens-retaining recess 228. Annular lip 226 defines magnet-retaining recesses 230 around the perimeter of lens-retaining recess 228. Annular lip 226 defines threaded or unthreaded through-holes 232 for receiving fasteners 216 around the perimeter of lens-retaining recess 228. Lens-retaining recess 228 is defined distally by inwardly extending annular lens-retention rim 234. Lens-retention rim 234 defines first window 238 therewithin.

Magnet-retaining recesses 230 extend distally toward proximally-facing, radially inwardly-extending magnet-retention rims 236 such that each of magnet-retaining circular recesses 230 are only partially occluded at its distal-most end by magnet-retention rims 236. Magnets 212 have distal ends shaped to fit distally into magnet-retaining recesses 230 of anchor body 110 and to abut distal magnet-retention rims 236.

Anchor cover 114 is of a ring shape and defines central window 240 therethrough. Anchor cover 114 further defines, around the perimeter of window 240, one or more magnet-retaining circular bores (not shown). The magnet-retaining circular bores are open distally and shaped to conform to and contain proximal ends of magnets 212 therein. Anchor cover 114 further defines, around the perimeter of window 240, threaded screw holes 246 and/or other mechanical retention structures for receiving the ends of fasteners 216.

Fasteners 216 comprise screws or other fastening devices fixing anchor cover 114 to anchor body 110 about magnets 212. Fasteners 216 may pass through through-holes 232 of anchor body 110 and may be threaded into screw holes 246 of anchor cover 114, thereby securing magnets 212 into magnet-retaining recesses 230 of anchor body 110 and into the aligned magnet-retaining circular bores of anchor cover 114.

Corrective lens 118 may be retained within lens-retaining recess 228, abutting the proximal surface of lens-retention rim 234.

Preferably, lens retaining ring 120 includes external threads. Threaded or unthreaded corrective lens retaining ring 120 may be affixed within threaded or unthreaded central window 240 of anchor cover 114. Corrective lens retaining ring 120 may touch the proximal surface of corrective lens 118. Alternatively, or additionally, threaded or unthreaded corrective lens retaining ring 120 may be affixed within threaded or unthreaded lens-retaining recess 228 of anchor body 110. In this arrangement, the corrective lens retaining ring 120 may also touch the proximal surface of corrective lens 118.

Optionally, an integral, distal surface of anchor cover 114 is assembled to retain corrective lens 118 against a proximal surface of anchor body 110, such as lens-retention rim 234.

Telescope subassembly 108 includes telescope body 122 and magnetic element 124. Magnetic element 124 may comprise an externally threaded or unthreaded ring affixed within an internally threaded or unthreaded proximal end of telescope body 122 such that the proximal surface of magnetic element 124 is flush with or protrudes proximally from the proximal edge of telescope body 122 in order to be proximate to, or to contact, magnets 212 retained by anchor subassembly 102. Telescope subassembly 108 includes magnification lens(es) 250.

Anchor assembly 102 defines a central bore open at its distal end and conforming to the proximal end of interchangeable telescope subassembly 108. Upon complete insertion of telescope subassembly 108 into the distal end of anchor subassembly 102, the proximal surface of magnetic ring 124 approaches or abuts the distal surfaces of magnet(s) 212 such that telescope subassembly 108 is held to anchor subassembly 102 by magnetic attraction between magnets 212 and magnetic element 124.

Alternatively, or additionally, (in a configuration not shown) telescope subassembly 108 may define a central bore to receive anchor assembly 102 such that one or more magnets affixed on one or the other subassembly effect magnetic attraction on one or more magnetic components affixed to or comprising corresponding positions of the other subassembly.

Figure 3:
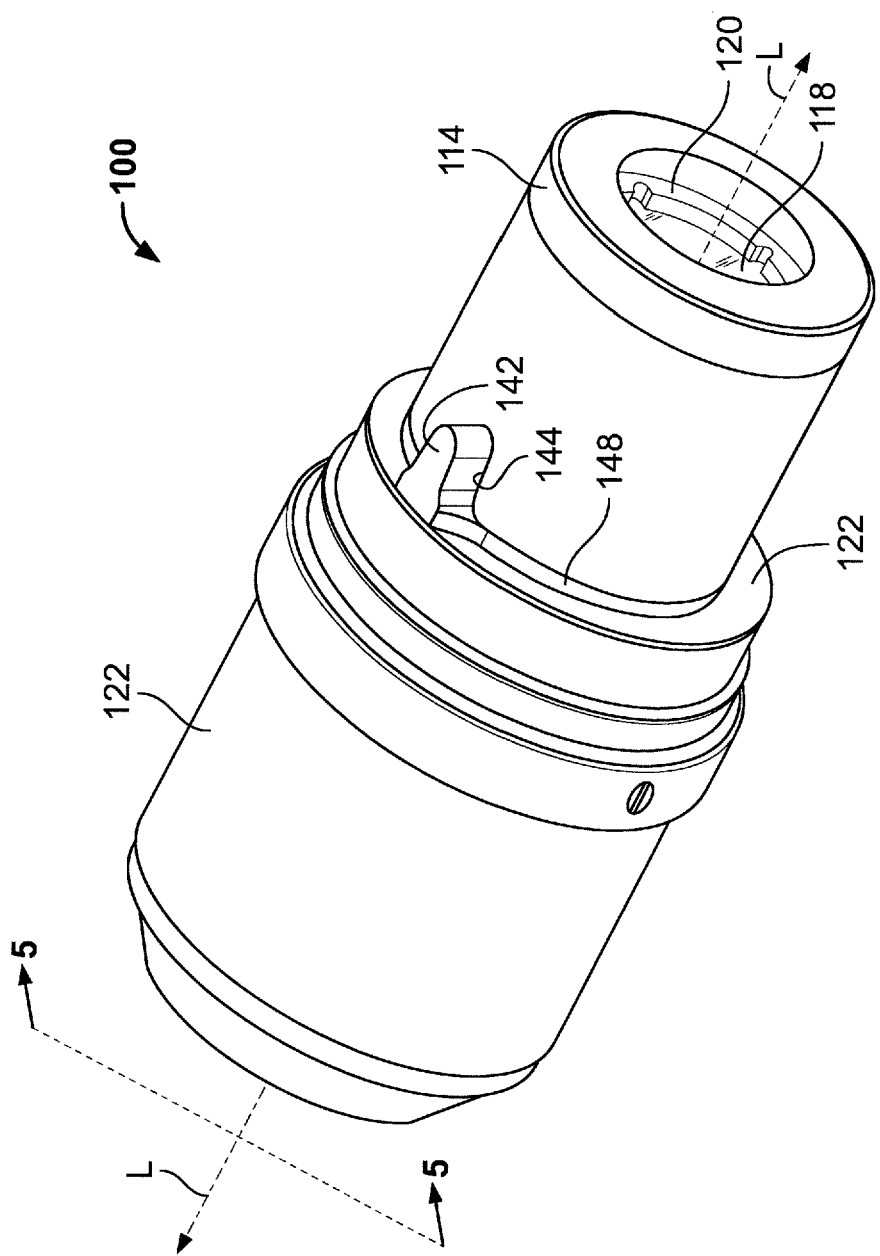
FIG. 3 shows an illustrative configuration of apparatus shown in FIG. 1 and FIG. 2.

FIG. 3 shows loupe subassembly 100 with telescope subassembly 108 aligned and inserted into anchor subassembly 102 (both 102 and 108 shown in FIGS. 1 and 2). Alignment and insertion of telescope subassembly 108 into anchor subassembly 102 may be performed by the practitioner prior to and/or during a procedure. The proximal surface of magnetic ring 124 (shown in FIGS. 1 and 2) abuts the distal surfaces of magnet(s) 212 (shown in FIG. 2) such that telescope subassembly 108 is held to anchor subassembly 102 by magnetic attraction between magnets 212 and magnetic element 124.

Figure 4:
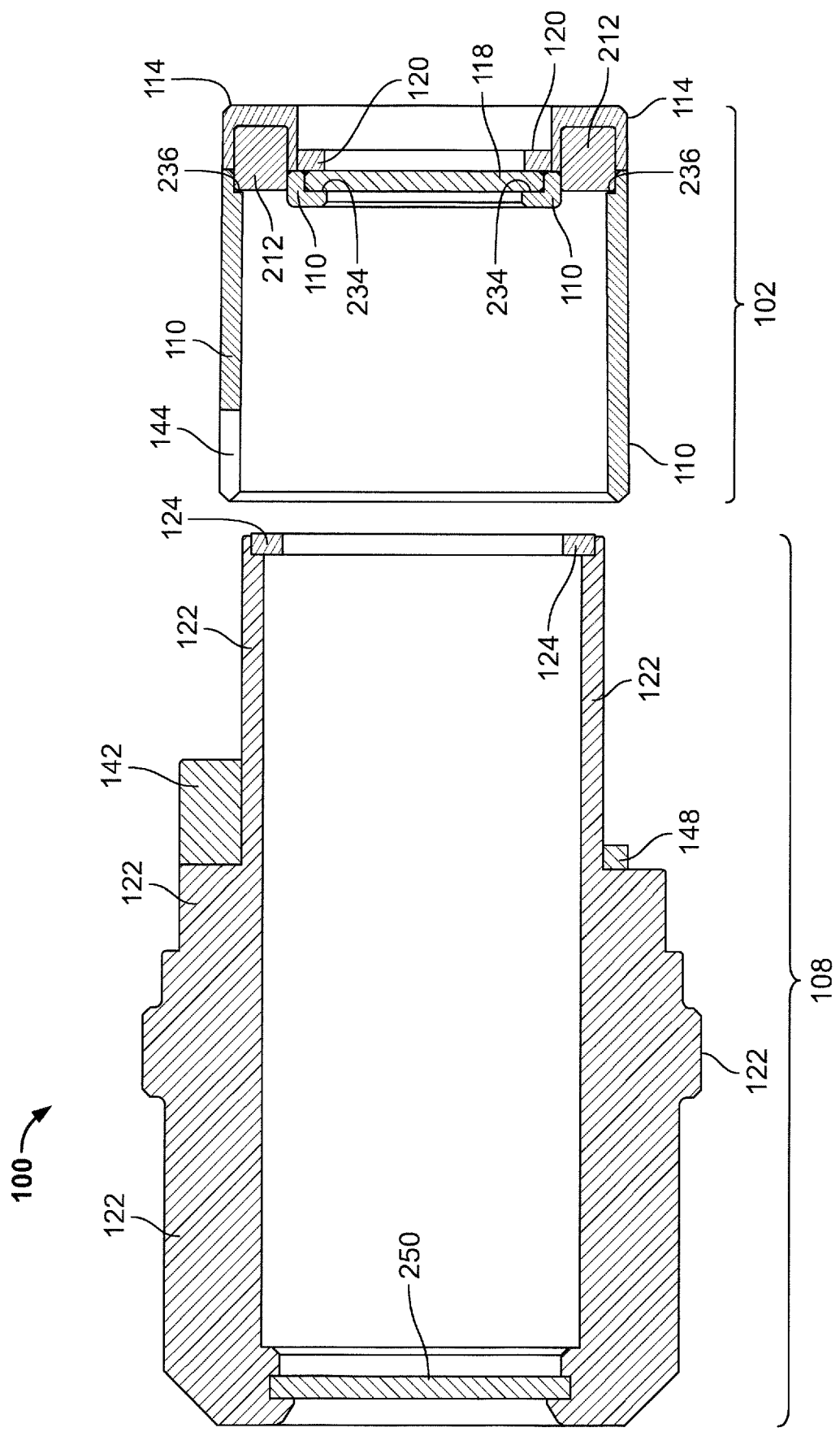
FIG. 4 shows an illustrative partial cross-sectional view of apparatus shown in FIG. 1.

FIG. 4 is a partial cross-sectional view of loupe subassembly 100 along view lines 4 (shown in FIG. 1). Telescope subassembly 108 is shown aligned for insertion into anchor subassembly 102.

The cross-sectional view depicts features of anchor subassembly 102: Magnets 212 held in place between anchor cover 114 and magnet retention rims 236 of anchor body 110; and corrective lens 118 held in place between lens retention ring 120 and lens-retention rim 234.

The cross-sectional view depicts features of telescope subassembly 108: Magnetic element 124 fixed to the proximal end of telescope body 122 configured for insertion into anchor subassembly 102; magnification lens(es) 250 fixed within telescope body 122; indexing ring 148 assembled to telescope subassembly 108; and indexing projection 142 of indexing ring 148 aligned opposite indexing notch 144 of anchor subassembly 102.

Figure 5:
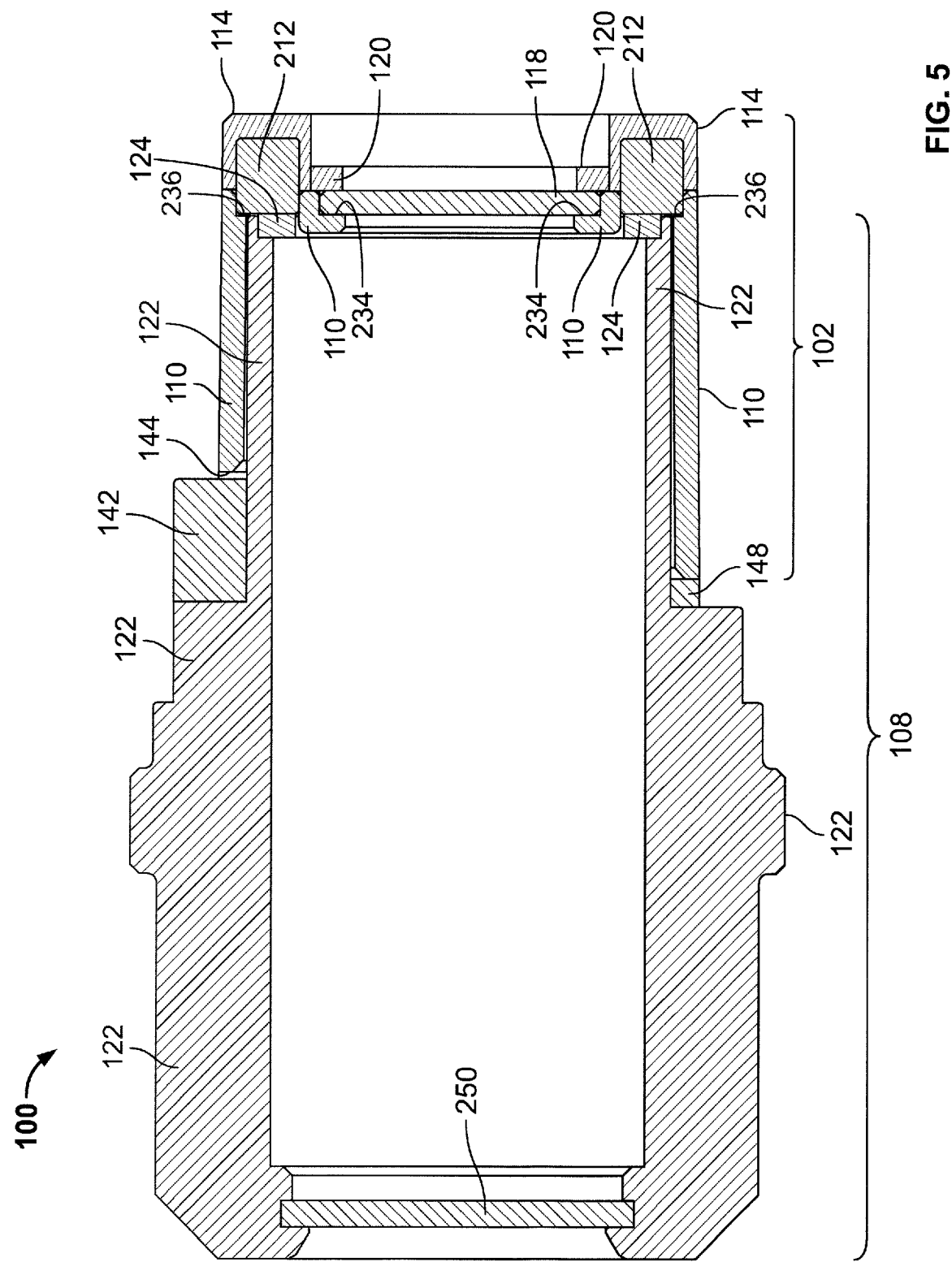
FIG. 5 shows an illustrative cross-sectional view of apparatus shown in FIG. 3.

FIG. 5 is a partial cross-sectional view of subassembly 100 along view lines 5 (shown in FIG. 3). Telescope subassembly 108 is shown fully inserted into anchor subassembly 102. Magnetic element 124 of telescope subassembly 108 is shown abutting or touching magnets 212 of anchor subassembly 102.

Figure 6:
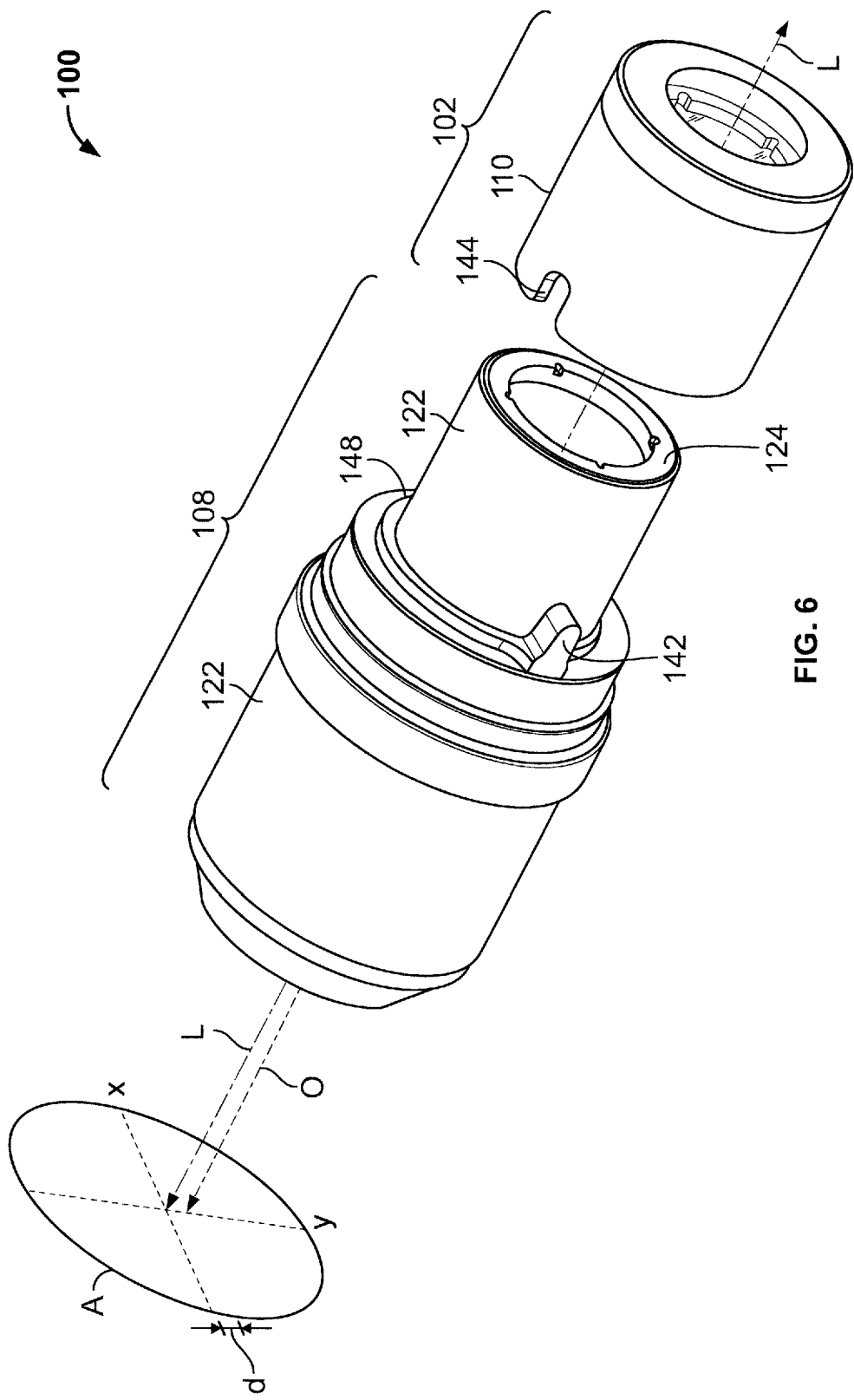
FIG. 6 shows an illustrative configuration of apparatus shown in FIGS. 1-4 and illustrative reference information associated with the configuration.

FIG. 6 portrays schematically optic axis O through a rotationally misaligned loupe subassembly 100. Indexing projection 142 is not rotationally aligned with indexing notch 144. Optical axis O of misaligned loupe subassembly 100 deviates by deviation distance d from a center of field-of-view aspect A (shown here as centered about axis L). Deviation distance d may be, for example, about 4 mm. Deviation d is shown along vertical axis y. Field-of-view aspect A may be at a typical working distance of the practitioner using loupe subassembly 100. At a typical working distance, deviation d along vertical axis y may be associated with more than about 0.5 prism diopters of vertical imbalance. At the typical working distance, deviation d along vertical axis y may be associated diplopia.

The typical working distance may be measured from a practitioner (e.g., an eye of the practitioner). The typical working distance may be measured from a proximal end of anchor subassembly 102, as suitably worn by the practitioner (e.g., using binocular anchor apparatus 852 shown in FIG. 8). The typical working distance may be measured from a distal end of telescope subassembly 108 when telescope subassembly 108 is assembled to anchor subassembly 102, and as suitably worn by the practitioner. The typical working distance may be measured from any suitable reference point.

Figure 7:
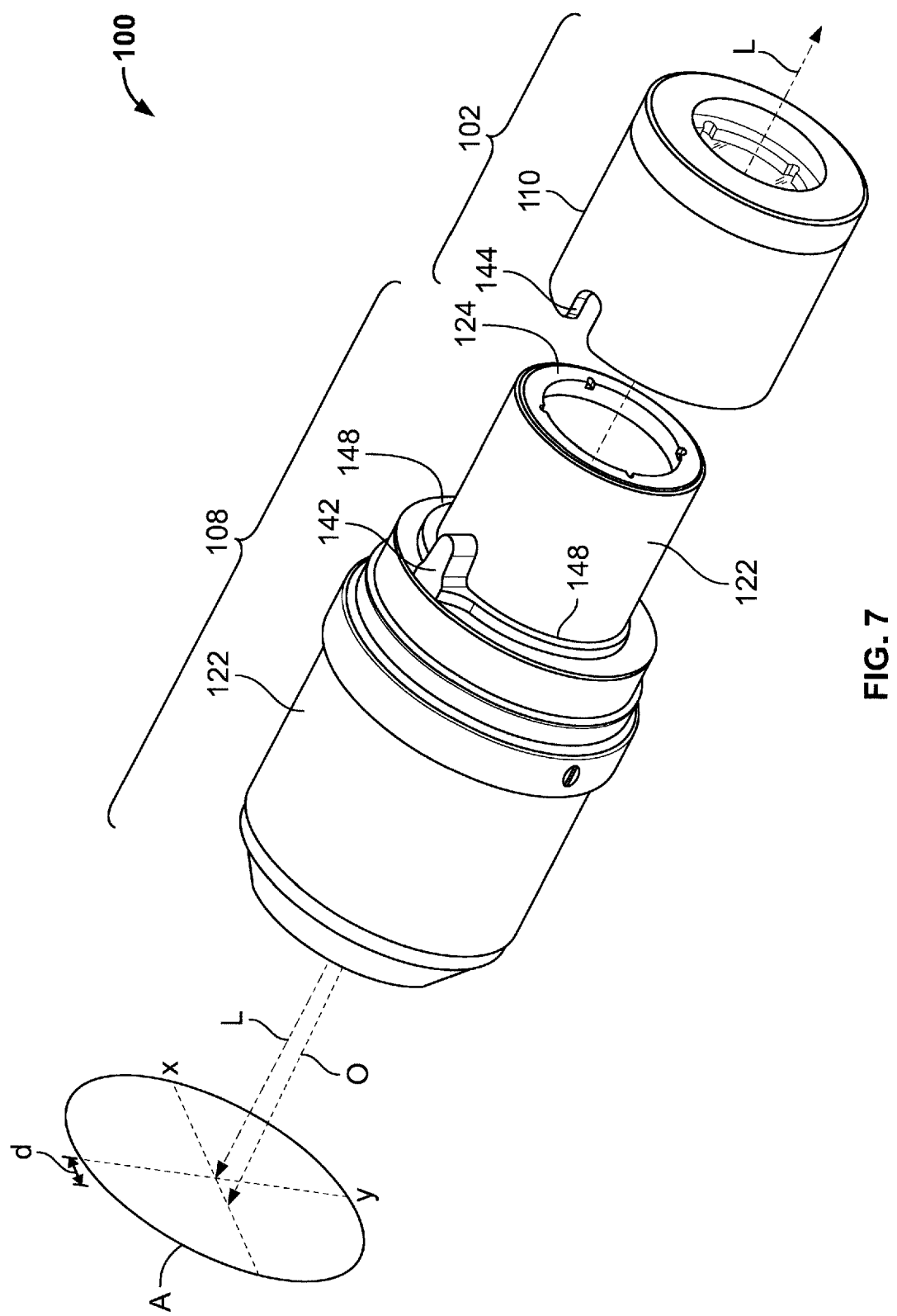
FIG. 7 shows an illustrative configuration of apparatus shown in FIG. 1 and illustrative reference information associated with the configuration.

FIG. 7 portrays schematically optic axis O through a rotationally aligned loupe subassembly 100. Indexing projection 142 is rotationally aligned with indexing notch 144 such that deviation d is along horizontal axis x. At the typical working distance, deviation d along horizontal axis x is not associated with more than about 0.5 prism diopters of vertical imbalance. At the typical working distance, deviation d along horizontal axis x is not associated with diplopia.

Figure 8:
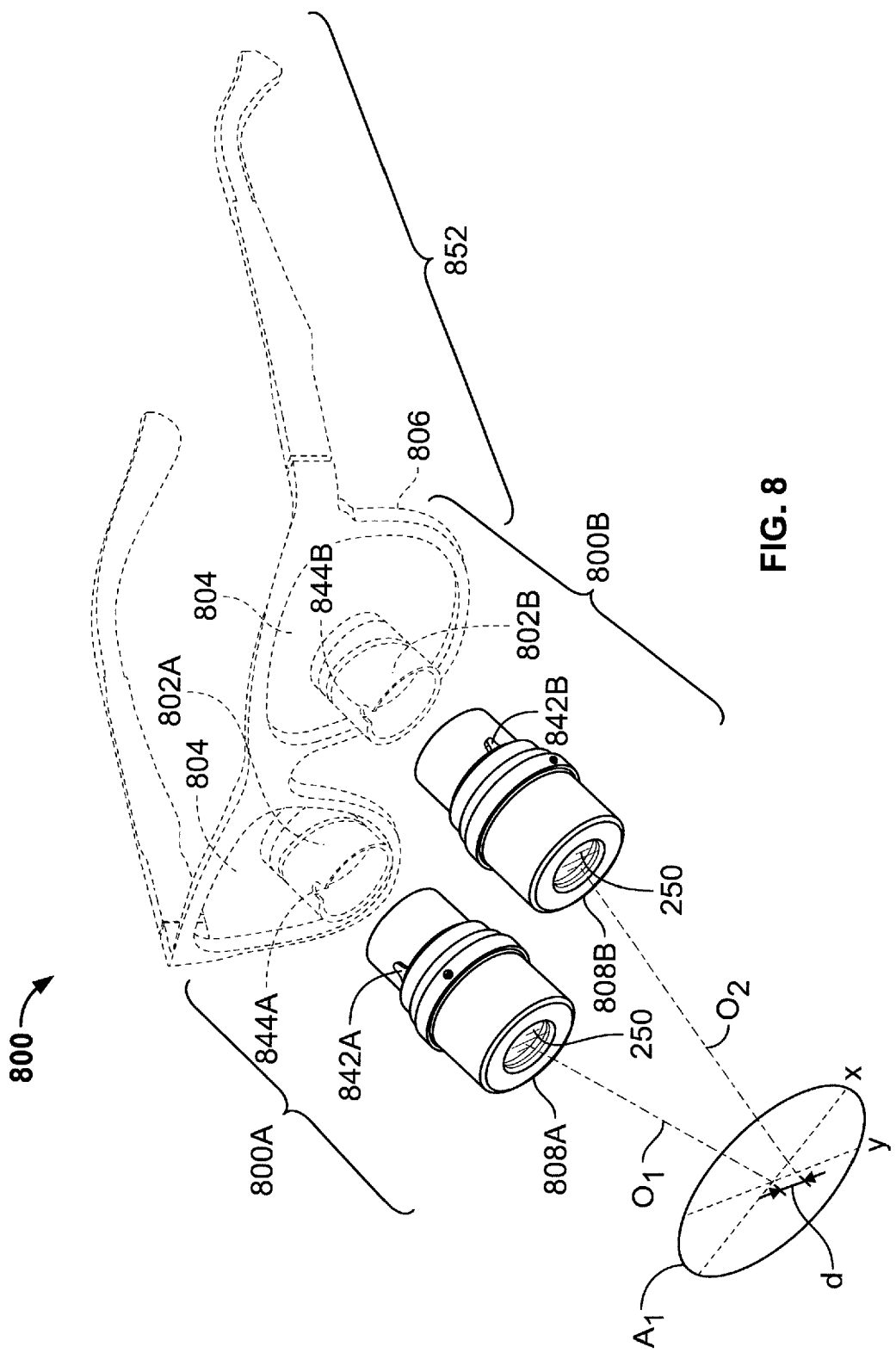
FIG. 8 shows illustrative apparatus and illustrative reference information in accordance with the principles of the disclosure.

FIG. 8 portrays schematically optic axes $O_1$ and $O_2$ of binocular loupe assembly 800. Binocular loupe assembly 800 includes loupe subassemblies 800A and 800B. Optic axes $O_1$ and $O_2$ are each respectively associated with loupe subassemblies 800A and 800B. Loupe subassembly 800A includes telescope subassembly 808A and anchor subassembly 802A (the latter shown in phantom). Loupe subassembly 800B includes telescope subassembly 808B and anchor subassembly 802B (the latter shown in phantom).

Telescope subassemblies 808A and 808B include some or all features of telescope subassemblies 108 shown in FIGS.

1-7. Telescope subassemblies 808A and 808B include, respectively, indexing projections 842A and 842B. Telescope subassemblies 808A and 808B are shown including magnification lenses, such as magnification lenses 250 (shown in FIGS. 2, 4 and 5).

Binocular loupe assembly 800 includes binocular anchor apparatus 852 (shown in phantom). Binocular anchor apparatus 852 includes carrier lenses 804. Binocular anchor apparatus 852 includes carrier lens frame 806. Binocular anchor apparatus 852 includes anchor subassembly 802A of loupe subassembly 800A and anchor subassembly 802B of loupe subassembly 800B. Anchor subassemblies 802A and 802B are embedded within carrier lenses 804. Carrier lenses 804 are attached to carrier lens frame 806. Anchor subassemblies 802A and 802B include some or all features of anchor subassemblies 102 shown in FIGS. 1-7. Anchor subassemblies 802A and 802B include, respectively, indexing notches 844A and 844B.

Indexing projection 842A of telescope subassembly 808A is shown rotationally aligned with corresponding indexing notch 844A, while indexing projection 842B of telescope subassembly 808B is shown rotationally misaligned with corresponding indexing notch 844B.

Field-of-view aspect $A_1$ is shown centered about optical axis $O_1$ of subassembly 800A. Field-of-view aspect $A_1$ may be at a typical working distance of the practitioner using loupe assembly 800.

Optical axis $O_2$ of loupe subassembly 800B deviates by deviation distance d from the center of field-of-view aspect $A_1$. Deviation d is along vertical axis y. Deviation d along vertical axis y may be associated with more than 0.5 prism diopters of vertical imbalance and/or diplopia.

Figure 9:
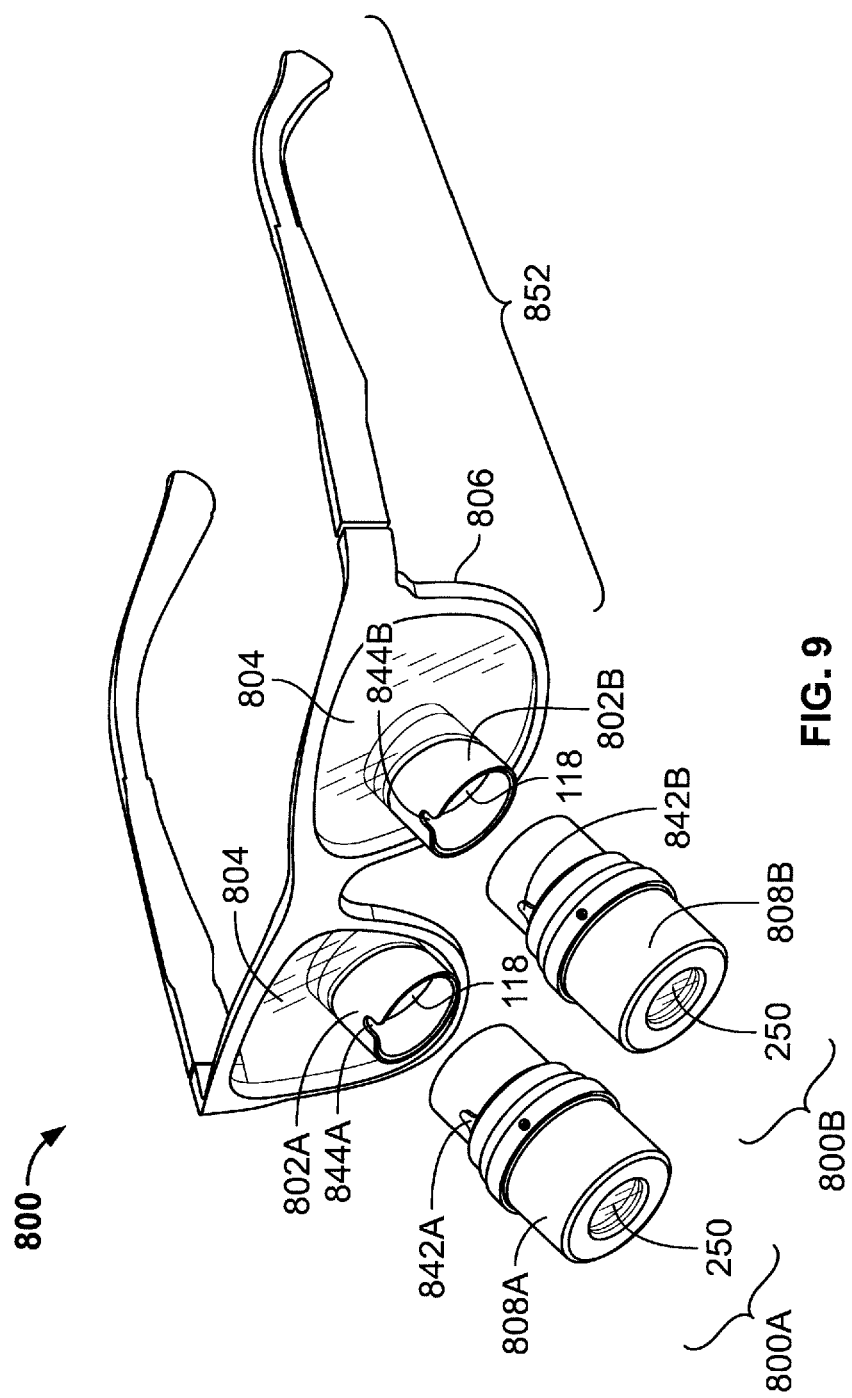
FIG. 9 shows an illustrative configuration of apparatus shown in FIG. 8.

FIG. 9 shows binocular loupe assembly 800 in a partially disassembled state. Binocular loupe assembly 800 includes binocular anchor apparatus 852, as well as telescope subassemblies 808A and 808B. Binocular anchor apparatus 852 includes carrier lens frame 806, carrier lenses 804 and anchor subassemblies 802A and 802B. Anchor subassemblies 802A and 802B may include corrective lenses such as corrective lens 118 shown in FIGS. 1-5). Anchor subassemblies 802A and 802B are embedded within corresponding carrier lenses 804. Carrier lenses 804 are attached to carrier lens frame 806. Telescope subassemblies 808A and 808B are shown aligned for insertion into anchor apparatus 852, with indexing projections 842A and 842B aligned for respective insertion into indexing notches 844A and 844B of respective anchor subassemblies 802A and 802B.

Figure 10:
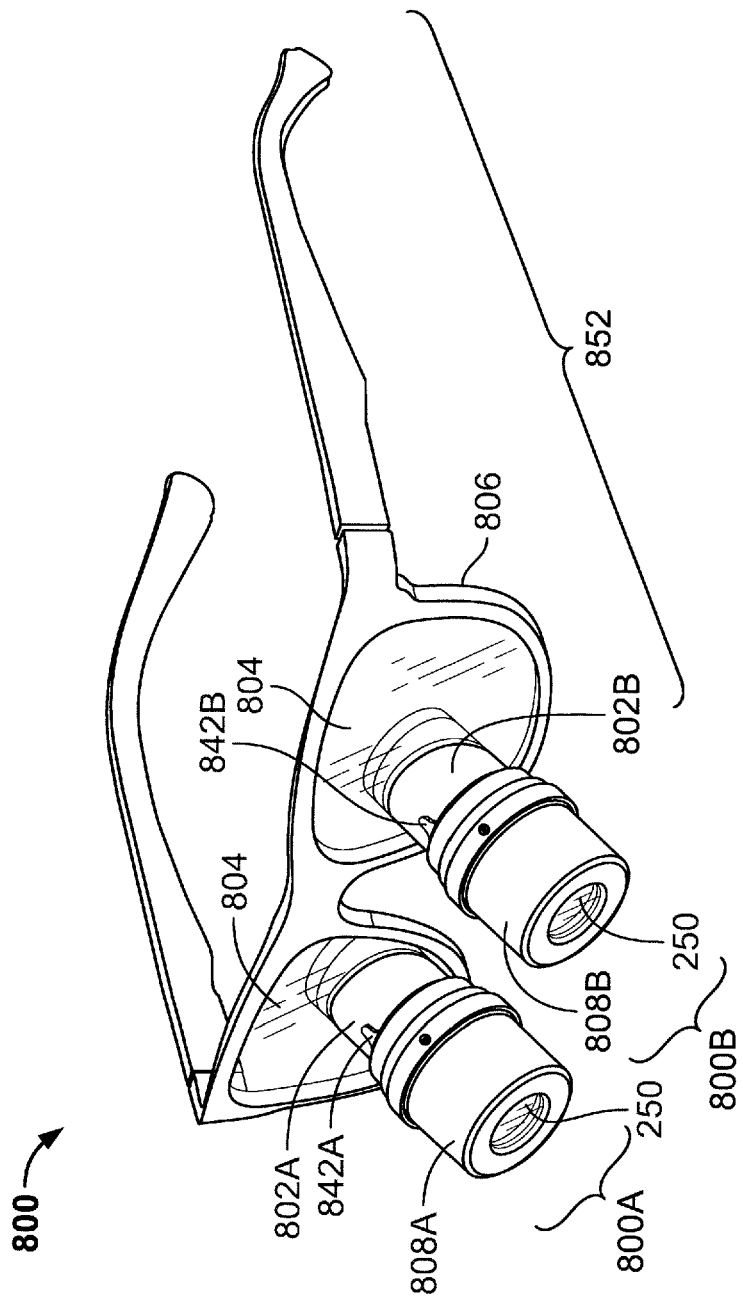
FIG. 10 shows an illustrative configuration of apparatus shown in FIGS. 8 and 9.

FIG. 10 shows binocular loupe assembly 800 in a fully assembled state. Loupe subassemblies 800A and 800B are shown fully assembled. Telescope subassemblies 808A and 808B are shown aligned and inserted respectively into corresponding anchor subassemblies 802A and 802B such that proximally-facing indexing projections 842A and 842B respectively mate with corresponding indexing notches 844A and 844B (shown in FIGS. 8-9) of respective anchor subassemblies 802A and 802B. Binocular loupe assembly 800 may be configured such that alignment and insertion of telescope subassemblies 808A and 808B into respective anchor subassemblies 802A and 802B may be performed by a practitioner prior to and/or during a procedure. Binocular loupe assembly 800 may be configured such that removal of telescope subassemblies 808A and 808B from anchor subassemblies 802A and 802B may be performed by the practitioner prior to, during and/or after the procedure.

Figure 11:
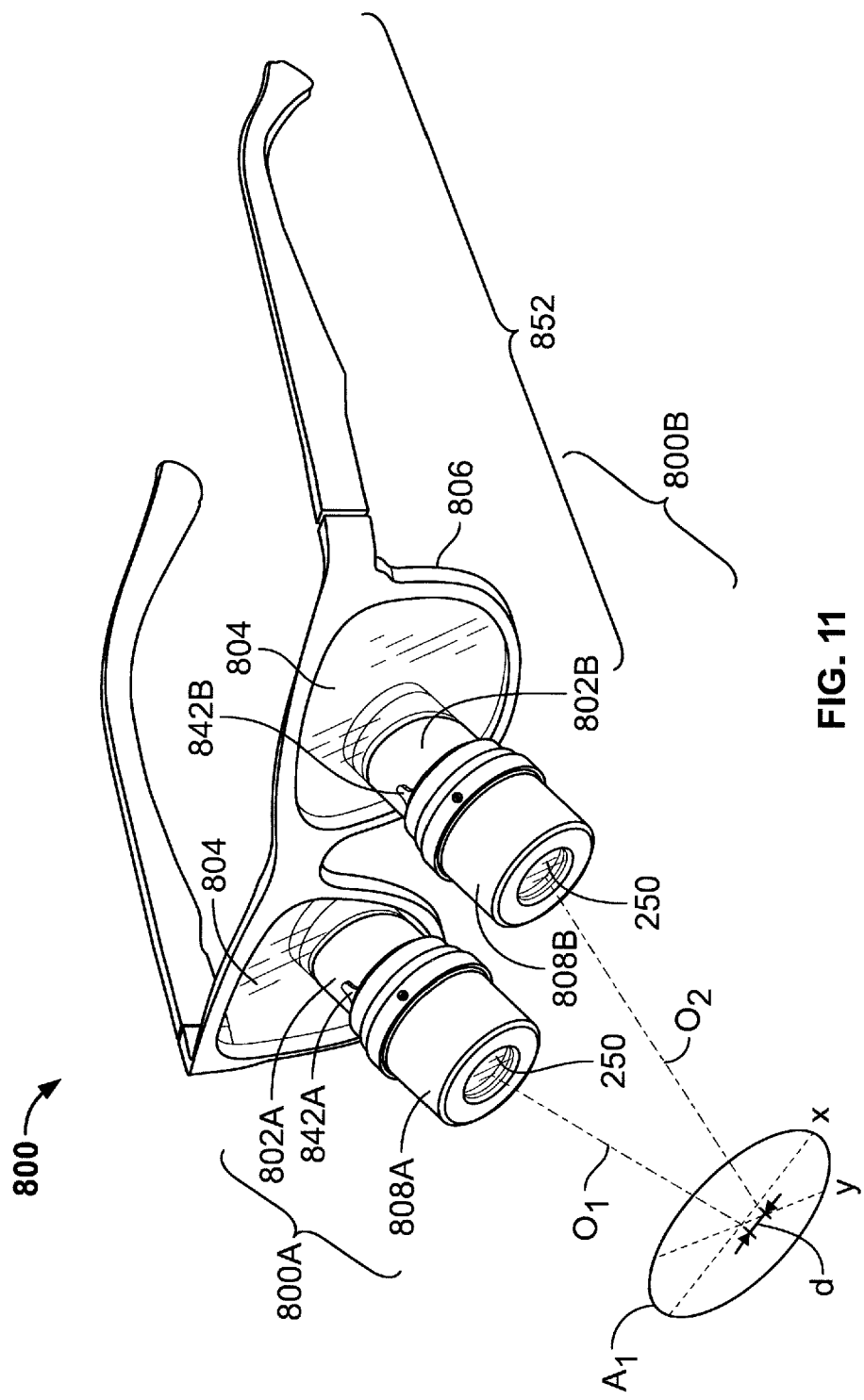
FIG. 11 shows an illustrative configuration of apparatus shown in FIG. 10 and illustrative reference information associated with the configuration.

FIG. 11 portrays schematically optic axes $O_1$ and $O_2$ through respective loupe subassemblies 800A and 800B of assembled binocular loupe assembly 800. Indexing projections 842A and 842B of respective telescope subassemblies 808A and 808B are shown rotationally aligned with and respectively inserted into corresponding indexing notches 844A and 844B of respective anchor subassemblies 802A and 802B. Optical axis $O_2$ of loupe subassembly 800B deviates by deviation distance d from the center of field-of-view aspect $A_1$ centered about optical axis of subassembly 800A. Field-of-view aspect $A_1$ may be at a typical working distance of the practitioner using loupe assembly 800. Deviation d is along horizontal axis x. Deviation d along horizontal axis x is not associated with more than 0.5 prism diopters of vertical imbalance and/or diplopia. By mating indexing projections 842A and 842B with respectively corresponding indexing notches 844A and 844B, loupe assembly 800 prevents rotation of telescope subassemblies 808A and 808B in respective anchor subassemblies 802A and 802B, thereby preventing deviation d from shifting toward vertical axis y, thereby avoiding vertical imbalance and/or diplopia. The rotational fixation of indexing projections 842A and 842B about the telescope subassemblies 808A and 808B, respectively, may be set during manufacture of telescope subassemblies 808A and 808B such that vertical imbalance and/or diplopia is minimized.

Figure 12:
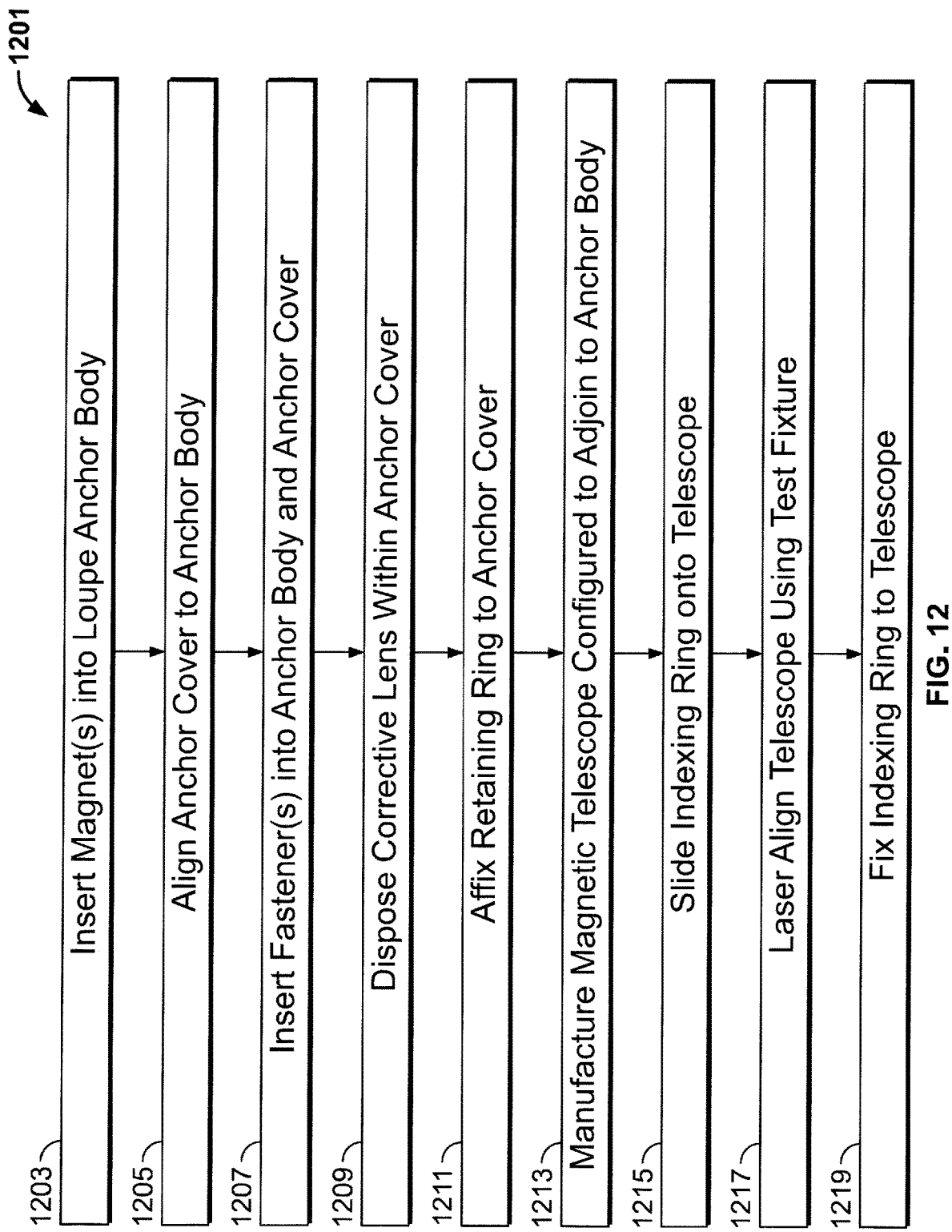
FIG. 12 shows an illustrative process in accordance with the principles of the disclosure.

FIG. 12 shows illustrative steps of manufacturing process 1201. Some steps of process 1201 may be performed by one person, while other steps may be performed by more than one person. For simplicity of presentation, the steps of the process are presented performed by a "fabricator," such as a manufacturer.

Process 1201 may begin at step 1203. At step 1203, the fabricator inserts magnet(s) (such as magnets 212 shown in FIGS. 2, 4 and 5) into an anchor body (such as anchor body 110, shown in FIGS. 1-7). The fabricator may insert the magnet(s) into recess(es) (such as recesses 230, shown in FIG. 2) of the anchor body. The magnet(s) may have an elongated cylindrical shape and/or may have a desired magnetic field shape and/or strength.

At step 1205, the fabricator aligns an anchor cover (such as anchor cover 114, shown in FIGS. 1-7) to the anchor body. The fabricator aligns the anchor cover to the anchor body such that end(s) of the magnet(s) emerging from the recess(es) of the anchor body project into bore(s) defined in the anchor cover. The fabricator may align the anchor cover to the anchor body such that through-hole(s) (such as through-holes 232, shown in FIG. 2) of the anchor body align with screw hole(s) (such as screw hole 246, shown in FIG. 2) of the anchor cover.

At step 1207, the fabricator inserts one or more fasteners (such as fasteners 216, shown in FIG. 2) into and/or through the anchor body and the anchor cover. The fabricator may insert the fastener(s) through the through-hole(s). The fabricator may thread the fastener(s) into the screw holes. The through-holes may be internally threaded and the fabricator may thread the fastener(s) through the through-holes. The fabricator may thread the fastener(s) into the anchor body. The fabricator may thread the fastener(s) into the anchor cover. The fabricator may insert one, some, or all of the fastener(s) first through the anchor body and then into the anchor cover. The fabricator may insert one, some, or all of the fastener(s) first through the anchor cover and then into the anchor body.

At step 1209, the fabricator disposes a corrective lens (such as lens 118, shown in FIGS. 1-5) within the anchor cover. The fabricator may dispose the corrective lens within the anchor body. The fabricator may insert the corrective lens into a central window of the anchor cover. The fabricator may insert the corrective lens partially and/or entirely into a lens-accommodating bay of the anchor body. The fabricator may dispose the corrective lens over a window of the anchor body.

At step 1211, the fabricator affixes one or more than one lens retaining ring (such as ring 120, shown in FIGS. 1-5) to the anchor cover. The fabricator may thread the retaining ring(s) via screw threads of the retaining ring(s) into complementarily contoured screw threads of the anchor cover and/or of the anchor body. The fabricator may snap/press-fit the retaining ring(s) into/onto the anchor cover and/or the anchor body. Alternatively, or additionally, the fabricator affixes the corrective lens by any suitable means, such as using adhesive and/or inserting the lens into a conforming recess.

At steps 1213, the fabricator manufactures and/or configures one or more magnetic telescope subassemblies (such as telescope subassembly 108, shown in FIGS. 1-7) including a telescope body (such as telescope body 122, shown in FIGS. 1-7) configured to adjoin to the anchor body. The fabricator affixes, directly or indirectly, one or more than one magnification lens (such as magnification lens 250, shown in FIGS. 2, 4, 5, and 8-11) to one or more than one magnetic element (such as magnetic element 124, shown in FIGS. 1-7). Alternatively, or additionally, the magnetic element(s) includes one or more than one integral and/or structural wall of the telescope body. The fabricator may affix the magnification lens(es) to the wall(s), e.g., by using retaining ring(s), adhesive and/or any other suitable means of fixation. The fabricator may construct the telescope subassembly such that an end of the telescope subassembly fits in, on, about and/or adjacent an end of the anchor body. The fabricator may attach the magnetic element(s) to the telescope body, e.g., by engaging screw threads of the magnetic element(s) with complementarily contoured screw threads of the telescope body and/or of a telescope cover adjoined to the telescope body. The telescope cover may include features of anchor cover 114. The fabricator may snap/press-fit the magnetic element(s) into/onto the telescope cover and/or the telescope body. The fabricator may manufacture the telescope subassembly such that the magnetic element(s) facilitate releasable adjoining the telescope subassembly with the anchor body by magnetic interaction with the magnet(s). Alternatively, or additionally, the fabricator may affix magnets to the telescope subassembly and/or magnetic elements to the anchor body. Alternatively, or additionally, the fabricator may form and/or affix mechanically releasable fixing mechanisms to the anchor subassemblies and/or to the telescope subassemblies.

At step 1215, the fabricator slides an indexing ring (such as indexing ring 148, shown in FIGS. 1-7) including one or more than one geometric feature (such as indexing projection 142, shown in FIGS. 1-7, and/or indexing projections 842A and/or 842B, shown in FIGS. 8-11) onto and/or about a surface of the telescope body. Alternatively, or additionally, the fabricator forms a geometric feature onto, into or about a surface of the telescope subassembly and/or telescope body. The feature conforms to a corresponding geometric feature of the anchor body (such as indexing notch 144, shown in FIGS. 1-7, and/or indexing notches 844A and 844B, shown in FIGS. 8, 9 and 11). Alternatively, or additionally, the indexing ring includes the magnet(s) and/or the magnetic element(s).

At step 1217, the fabricator aligns the telescope subassembly and/or telescope body using a laser and test fixture. The indexing ring is rotated into position based on the alignment indicated by the test fixture to eliminate some or all detected vertical deviation of the telescope's magnification lens, upon insertion into the anchor subassembly. Alternatively, or additionally, the fabricator rotates the lens relative to the geometric feature of the telescope until some or all of the deviation detected using the laser and test fixture should be eliminated when the corresponding geometric features of the telescope and anchor body are aligned by a health care practitioner.

At step 1219, after the alignment, the fabricator permanently fixes the indexing ring onto the telescope, at a position that facilitates a user aligning geometric feature(s) (such as projection 142) of the indexing ring with corresponding geometric feature(s) (such as indexing notch 144) on the anchor body, thereby minimizing or eliminating vertical deviation present in the telescope. Alternatively, or additionally, upon the alignment using the test fixture, the fabricator permanently fixes the magnification lens relative to geometric feature(s) of the telescope subassembly so as to facilitate the user's installation of the telescope subassembly to the anchor subassembly in a manner that minimizes or eliminates the vertical deviation.

Figure 13B:
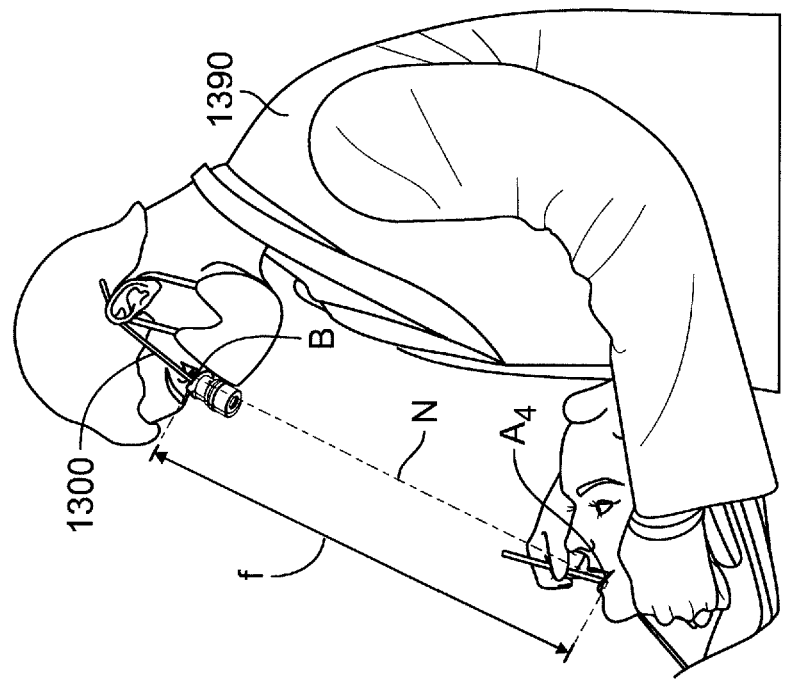
FIG. 13B shows illustrative apparatus and illustrative reference information in accordance with the principles of the disclosure.
Figure 13A:
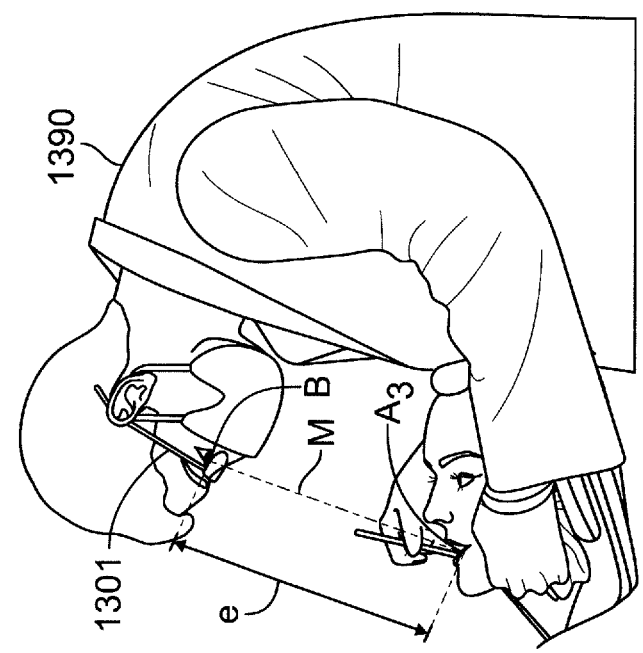
FIG. 13A shows illustrative apparatus and illustrative reference information in accordance with the principles of the disclosure.

FIGS. 13A and 13B show practitioner 1390 performing a procedure. In FIG. 13A, practitioner 1390 may be at a typical working distance for viewing a work area including aspect $A_3$ within the practitioner's field-of-view. Practitioner 1390 is shown wearing corrective eyewear 1301. Using eyewear 1301, practitioner 1390 may view aspect $A_3$ along view line M. View line M may extend from B (at or near an eye of practitioner 1390) to aspect $A_3$. View line M has length e. Viewing aspect $A_3$ from distance e may require practitioner 1390 to hunch over, which may result in discomfort or other detrimental effects on practitioner 1390. Such detrimental effects include as poor posture and resultant back, neck and/or shoulder pain.

In FIG. 13B, practitioner 1390 may be at a typical working distance for viewing a work area including aspect $A_4$ with the practitioner's field-of-view. Practitioner 1390 is shown wearing magnification eyewear 1300, which may include some or all features of loupe assembly 800. Using eyewear 1300, practitioner 1390 may view aspect $A_4$ along view line N. View line N may run from B (at or near an eye of practitioner 1390) to aspect $A_4$. View line N has length f. Magnification of the work area by magnification eyewear 1300 may enable viewing aspect $A_4$ from distance f thereby enabling practitioner 1390 to stand erect. Standing erect may, in turn, prevent the detrimental health issues associated with hunching over to view the work area, such as may be necessary to view the work area without magnification eyewear 1300, as in FIG. 13A.

The working distance of f, shown in FIG. 13B, may be significantly greater than the working distance of e, shown in FIG. 13A. Accordingly, any vertical deviation present in magnification eyewear 1300 is all the more likely to result in more than about 0.5 prism diopters of vertical imbalance and/or diplopia. By correctly aligning deviation present in magnification eyewear 1300 to a horizontal plane, as in loupe assembly 800, the deviation may avoid more than about 0.5 prism diopters of vertical imbalance and/or diplopia for practitioner 1390 even at working distance f.

Further, illustrative embodiments of the disclosure include:

1. An ocular aligning ring for preventing vertical deviation of an ocular telescope device, the telescope device including a magnification lens and configured for replaceable insertion into an anchoring device of loupe carrier frames, the ring comprising an indexing projection configured to mate with a corresponding indexing notch of the anchoring device, wherein the ring is configured to be fixed to the telescope device upon rotational alignment of the telescope device.

2. The aligning ring of embodiment 1 wherein the indexing projection is configured to be externally viewable after the insertion of the telescope device into the anchoring device.

3. A loupe device for magnifying an object, the loupe device including a proximal end and a distal end and comprising:
   a loupe anchor including:
      a corrective lens; and
      a first external geometry;
   an interchangeable telescope having a weight and including:
      one or more than one magnification lens; and
      a second external geometry configured to mate with the first geometry to prevent a rotation of the telescope relative to the anchor,
   wherein, upon assembly of the telescope to the anchor, the interchangeable telescope is held to the anchor by magnetic attraction therebetween, the magnetic attraction sufficient to withstand a force.

4. The loupe device of embodiment 3 wherein the interchangeable telescope includes one or more than one magnetic element and the anchor body includes one or more magnets oriented and configured to provide the magnetic attraction.

5. The loupe device of embodiment 4 wherein the magnets comprise elongated cylindrical shapes defining longitudinal axes between proximal and distal ends, the distal ends oriented to provide the magnetic attraction.

6. The loupe device of embodiment 4 wherein the magnetic element comprises a steel ring.

7. The loupe device of embodiment 3 wherein an indexing ring assembled to the telescope includes the second geometry.

8. The loupe device of embodiment 7 wherein the indexing ring is affixed to the telescope at a rotational orientation configured to prevent vertical deviation of an optical axis of the telescope upon assembly of the telescope to the anchor.

9. A binocular loupe system for magnifying an object during a procedure, comprising a pair of the loupe devices of embodiment 3, and further comprising:
   a carrier lens frame; and
   a pair of carrier lenses, wherein the loupe devices are embedded within the carrier lenses, and the carrier lenses are attached to the carrier lens frame.

10. A loupe device for magnifying an object, the loupe device defining an axis between proximal and distal ends thereof and comprising:
    an anchor assembly, including:
       an anchor body with a distal external geometry;
       one or more magnets; and
       a corrective lens; and
    an interchangeable telescope assembly, including:
       an interchangeable telescope;
       a magnetic element; and
       an indexing ring including a proximal external geometry configured for mating with the anchor body distal external geometry, wherein:
    the interchangeable telescope assembly is configured to be held to the anchor assembly by magnetic attraction between the magnets and the magnetic element; and
    the indexing ring external geometry is configured to align and mate with the anchor external geometry such that, upon assembly of the telescope assembly to the anchor assembly, the telescope assembly is rotationally fixed with respect to the anchor assembly.

11. An interchangeable loupe device configured to prevent diplopia and having a distal end and a proximal end, the loupe device comprising:
    an anchor assembly, including:
       an anchor body including a distal anchor body external geometry;
       one or more magnets;
       an anchor cover;
       one or more fasteners fixing the anchor cover to the anchor body about the magnets;
       a corrective lens; and
       a corrective lens retaining ring; and
    an interchangeable telescope assembly, including:
       an interchangeable telescope;
       a magnetic element; and
       an indexing ring including a proximal indexing ring external geometry for mating with the anchor body external geometry, wherein:
    the interchangeable telescope assembly is configured to be held to the anchor assembly by magnetic attraction between the magnets and the magnetic element; and
    the indexing ring external geometry is configured to align and mate with the anchor external geometry such that, upon assembly of the telescope assembly to the anchor assembly, the telescope assembly is rotationally fixed with respect to the anchor assembly.

12. The loupe device of embodiment 11 wherein the one or more magnets are cylindrical.

13. A binocular loupe system for magnifying an object during a procedure, comprising a pair of the loupe devices of embodiment 11, and further comprising:
    a carrier lens frame;
    a pair of carrier lenses;
    wherein the loupe devices are embedded within the carrier lenses, and the carrier lenses are attached to the carrier lens frame.

14. A binocular loupe system for magnifying an object during a procedure, comprising:
    a binocular anchor apparatus having:
       a carrier lens frame;
       a pair of carrier lenses; and
       a pair of fixed anchor assemblies, each including:
          an anchor body including, at a distal end thereof, an anchor external geometry;
          one or more cylindrical magnets;
          an anchor cover;
          fasteners fixing the anchor cover to the anchor body about the cylindrical magnets;
          a corrective lens; and
          a corrective lens retaining ring; and
    one or more pairs of interchangeable telescope assemblies, each pair including:
       interchangeable telescopes;
       indexing rings including indexing ring external geometries at proximal ends thereof; and
       magnetic elements,
    wherein:
    the interchangeable telescope assemblies are configured to be held to the anchor assemblies by magnetic attraction between the magnets and the magnetic elements; and
    the indexing ring external geometries are configured to align and mate with the anchor external geometries such that, upon assembly of the telescope assemblies to the anchor assemblies, the telescope assemblies are rotationally fixed with respect to the anchor assemblies.

15. A method of manufacturing a binocular loupe system, the binocular loupe system including 1) a carrier lens frame, 2) a pair of carrier lenses, 3) a pair of fixed anchor assemblies, each anchor assembly including an anchor body, one or more magnets, an anchor cover, one or more fasteners for fixing the anchor cover to the anchor body about the magnets, a corrective lens, and a corrective lens retaining ring, and 4) a pair of interchangeable telescope assemblies, the telescope assemblies having proximal ends configured for removable assembly to distal ends of the anchor assemblies and including interchangeable telescopes, magnetic elements and rotational indexing rings including proximal external geometries corresponding to distal geometries of the anchor bodies, the method comprising the steps of:

affixing the carrier lenses to the carrier frames;
inserting the magnets into the anchor body;
threading the fasteners through the anchor body and the anchor cover;
inserting the corrective lens into the anchor body;
affixing the corrective lens retaining ring into the anchor cover;
affixing the anchor assemblies into the carrier lenses;
affixing the magnetic elements into the interchangeable telescopes;
inserting the indexing rings over the proximal ends of the telescopes such that the geometries of the indexing rings face the proximal ends;
rotationally aligning the telescopes to prevent vertical deviation of optical axes of the telescopes; and
fixing the indexing rings to the telescopes to prevent the vertical deviation of the optical axes of the telescopes upon assembly of the telescopes to the anchor bodies.

16. A method of manufacturing a custom interchangeable loupe telescope device, the device having a proximal end configured for insertion into a distal end of an anchoring device held by a carrier lens, the method comprising:

inserting an indexing ring over the proximal end of the telescope device such that an indexing geometry of the indexing ring faces proximally;
rotationally aligning the telescope device; and
fixing the indexing ring to the telescope device,
wherein the geometry is configured to mate with a corresponding indexing geometry of the anchoring device.

17. The method of embodiment 16 wherein the aligning includes laser aligning on a test fixture.

18. The method of embodiment 16 wherein the indexing geometry of the indexing ring includes a projection and the indexing geometry of the anchoring device includes a notch.

19. The method of embodiment 16 wherein the indexing geometry of the indexing ring includes a notch and the indexing geometry of the anchoring device includes a projection.

20. A method of assembling a loupe device, the loupe device including a pair of interchangeable telescopes and a pair of telescope anchors, the telescopes including geometries for mating with corresponding geometries of the anchors, the method comprising:

aligning the geometries of the telescopes with the corresponding geometries of the anchors; and
inserting the telescopes into the anchors,
wherein a surface of the telescope geometries is visible in the assembled loupe device.

Thus, apparatus and methods for rotational alignment of interchangeable telescope assemblies for loupe devices are provided. Persons skilled in the art will appreciate that the present disclosure can be practiced by other than the described embodiments, which are presented for the purpose of illustration rather than of limitation. The present disclosure is limited only by the claims that follow.

What is claimed is:

1. An interchangeable loupe device comprising:
an anchor assembly; and
a telescope assembly defining a central longitudinal axis, an optical axis and a field-of-view plane, the field-of-view plane having a horizontal axis and a vertical axis and wherein the optical axis deviates from the central longitudinal axis, and the telescope assembly is rotatable about the central longitudinal axis to an orientation such that the deviation of the optical axis from the central longitudinal axis is oriented along the horizontal axis of the field-of-view plane, but not along the vertical axis of the field-of-view plane, to reduce or eliminate vertical diplopia;
wherein the telescope assembly comprises a geometric feature that is configured to mate with a corresponding geometric feature in the anchor assembly and thereby fix a rotational orientation of the deviation of the optical axis from the central longitudinal axis along the horizontal axis.

2. The interchangeable loupe device of claim 1, wherein deviation of the optical axis is sufficient to cause more than 0.5 prism diopters of vertical imbalance to a practitioner using the interchangeable loupe device at a working distance of 0.3 to 0.7 meters.

3. The interchangeable loupe device of claim 2 wherein:
the geometric feature comprises a protrusion; and
the corresponding geometric feature comprises a notch configured to receive the protrusion.

4. The interchangeable loupe device of claim 1 wherein the telescope assembly is held to the anchor assembly by magnetic attraction between a first magnetic element of the telescope assembly and a second magnetic element of the anchor assembly.

5. The interchangeable loupe device of claim 4 wherein the first magnetic element comprises a steel ring.

6. The interchangeable loupe device of claim 5 wherein the steel ring comprises the geometric feature.

7. The interchangeable loupe device of claim 5 wherein the steel ring is configured to be fixed to the telescope assembly after orienting deviation of the optical axis along the horizontal axis.

8. The interchangeable loupe device of claim 1 wherein the geometric feature is externally visible after the geometric feature of the telescope assembly mates with the corresponding geometric feature of the anchor assembly.

9. The interchangeable loupe device of claim 1 wherein the telescope assembly is a first telescope assembly, the loupe device further comprising a second telescope assembly, wherein the second telescope assembly comprises a second geometric feature that mates with the corresponding geometric feature; and the first telescope assembly and the second telescope assembly are interchangeable such that only one of the first telescope assembly or the second telescope assembly is mated with the corresponding geometric feature at a time.

10. The interchangeable loupe device of claim 9 wherein:
the first telescope assembly provides a first magnification level; and
the second telescope assembly provides a second magnification level.

11. The interchangeable loupe device of claim 1, wherein:
the telescope assembly is a first telescope assembly;
the loupe device further comprises a second telescope assembly;
the first telescope assembly provides a first magnification level; and
the second telescope assembly provides a second magnification level;
the first telescope assembly is configured to mate with the anchor assembly;
the second telescope assembly is configured to mate with the anchor assembly; and
the first telescope assembly and the second telescope assembly are interchangeable such that only one of the first telescope assembly or the second telescope assembly is mated with the anchor assembly at a time.

12. The interchangeable loupe device of claim 1 wherein:
the telescope assembly is a first telescope assembly;
the anchor assembly is a first anchor assembly;
the loupe device further comprises a second telescope assembly and a second anchor assembly;
the first telescope assembly is configured to mate with the first anchor assembly; and
the second telescope assembly is configured to mate with the second anchor assembly.

13. The interchangeable loupe device of claim 1 wherein the telescope assembly comprises an indexing feature positioned about a body of the telescope assembly, wherein the indexing feature includes the geometric feature.

14. The interchangeable loupe device of claim 1 wherein reducing or eliminating the vertical diplopia enables a first maximum working distance between a wearer of the interchangeable loupe device and a work area that is longer than a second maximum working distance between the wearer and the work area that would be possible if the deviation would be oriented along the vertical axis of the field-of-view plane.

15. The interchangeable loupe device of claim 1 wherein the telescope assembly is rotatable about the central longitudinal axis to be oriented so as not to be associated with more than 0.5 prism diopters of vertical imbalance within the range of a working distance between a wearer of the interchangeable loupe device and a work area so as to minimize or eliminate vertical diplopia.

* * * * *